(12) United States Patent
Miu et al.

(10) Patent No.: US 12,117,555 B2
(45) Date of Patent: Oct. 15, 2024

(54) VEHICULAR EXTERIOR DOOR HANDLE ASSEMBLY WITH RADAR MODULE AND ENHANCED THERMAL MANAGEMENT

(71) Applicant: Magna Mirrors of America, Inc., Holland, MI (US)

(72) Inventors: Traian Miu, Oakville (CA); Gabriele W. Sabatini, Keswick (CA); Kurt M. Schatz, Uxbridge (CA); Eric Peterson, West Olive, MI (US); Gregory A. Huizen, Hudsonville, MI (US); James J. Ferri, Maple (CA)

(73) Assignee: Magna Mirrors of America, Inc., Holland, MI (US)

( * ) Notice: Subject to any disclaimer, the term of this patent is extended or adjusted under 35 U.S.C. 154(b) by 381 days.

(21) Appl. No.: 17/643,609

(22) Filed: Dec. 10, 2021

(65) Prior Publication Data

US 2022/0187416 A1 Jun. 16, 2022

Related U.S. Application Data

(60) Provisional application No. 63/202,091, filed on May 27, 2021, provisional application No. 63/124,393, filed on Dec. 11, 2020.

(51) Int. Cl.
*G01S 7/02* (2006.01)
*E05B 85/10* (2014.01)
*G01S 13/931* (2020.01)

(52) U.S. Cl.
CPC ............. *G01S 7/027* (2021.05); *E05B 85/10* (2013.01); *G01S 13/931* (2013.01); *G01S 2013/9315* (2020.01); *G01S 2013/93274* (2020.01)

(58) Field of Classification Search
None
See application file for complete search history.

(56) References Cited

U.S. PATENT DOCUMENTS

| | | | |
|---|---|---|---|
| 5,497,305 | A | 3/1996 | Pastrick et al. |
| 5,671,996 | A | 9/1997 | Bos et al. |
| 5,938,321 | A | 8/1999 | Bos et al. |
| 6,086,229 | A | 7/2000 | Pastrick |
| 6,139,172 | A | 10/2000 | Bos et al. |
| 6,149,287 | A | 11/2000 | Pastrick et al. |
| 6,152,590 | A | 11/2000 | Furst et al. |
| 6,176,602 | B1 | 1/2001 | Pastrick et al. |
| 6,276,821 | B1 | 8/2001 | Pastrick et al. |
| 6,280,069 | B1 | 8/2001 | Pastrick et al. |
| 6,291,905 | B1 | 9/2001 | Drummond et al. |
| 6,349,450 | B1 | 2/2002 | Koops et al. |

(Continued)

*Primary Examiner* — Vladimir Magloire
*Assistant Examiner* — David C. Schultz
(74) *Attorney, Agent, or Firm* — HONIGMAN LLP

(57) ABSTRACT

A radar sensor assembly includes a sensor printed circuit board (PCB) having a first side and a second side opposite the first side. A radar transceiver is disposed at the first side of the sensor PCB and includes a plurality of antennas configured for transmitting and receiving radio frequency (RF) radiation. A heat sink is disposed adjacent to the radar transceiver and is configured to dissipate heat from the radar transceiver. The radar transceiver is sandwiched between the heat sink and the sensor PCB. The heat sink is configured to allow the RF radiation to pass therethrough without guiding the RF radiation.

12 Claims, 26 Drawing Sheets

(56) References Cited

U.S. PATENT DOCUMENTS

| | | |
|---|---|---|
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,907,643 B2 | 6/2005 | Koops et al. |
| 6,919,549 B2 | 7/2005 | Bamji et al. |
| 6,977,619 B2 | 12/2005 | March et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,407,203 B2 | 8/2008 | Huizenga et al. |
| 7,408,627 B2 | 8/2008 | Bamji et al. |
| 8,013,780 B2 | 9/2011 | Lynam |
| 8,027,029 B2 | 9/2011 | Lu et al. |
| 8,333,492 B2 | 12/2012 | Dingman et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 9,036,026 B2 | 5/2015 | Dellantoni et al. |
| 9,146,898 B2 | 9/2015 | Ihlenburg et al. |
| 9,290,970 B2 | 3/2016 | De Wind et al. |
| 9,484,626 B2 | 11/2016 | Dykhouse |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,850,595 B2 | 12/2020 | Miu et al. |
| 11,542,732 B2 | 1/2023 | Schatz |
| 11,631,625 B2 * | 4/2023 | Vincent ............... H01Q 1/2283 165/80.3 |
| 11,746,575 B2 | 9/2023 | Cervone et al. |
| 11,866,983 B2 | 1/2024 | Schatz et al. |
| 2010/0007463 A1 | 1/2010 | Dingman et al. |
| 2010/0088855 A1 | 4/2010 | Ruse et al. |
| 2010/0245066 A1 | 9/2010 | Sarioglu et al. |
| 2013/0242586 A1 | 9/2013 | Huizen et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0115356 A1 * | 4/2018 | Jain .......................... H01L 24/16 |
| 2018/0212306 A1 * | 7/2018 | Elsherbini ............ H01Q 1/2283 |
| 2018/0231635 A1 | 8/2018 | Woehlte |
| 2019/0106051 A1 | 4/2019 | Huizen et al. |
| 2019/0339382 A1 | 11/2019 | Hess et al. |
| 2020/0102773 A1 | 4/2020 | Sobecki |
| 2020/0122631 A1 | 4/2020 | Huizen et al. |
| 2020/0130646 A1 | 4/2020 | Peterson |
| 2020/0166637 A1 * | 5/2020 | Hess ...................... G01S 7/032 |
| 2022/0282534 A1 | 9/2022 | Peterson et al. |
| 2022/0349220 A1 | 11/2022 | Ferri et al. |

* cited by examiner

Air flow during vehicle operation enters at front of handle assembly and is routed through

VEHICULAR EXTERIOR DOOR HANDLE ASSEMBLY WITH RADAR MODULE AND ENHANCED THERMAL MANAGEMENT

CROSS REFERENCE TO RELATED APPLICATIONS

The present application claims the filing benefits of U.S. provisional application Ser. No. 63/202,091, filed May 27, 2021, and U.S. provisional application Ser. No. 63/124,393, filed Dec. 11, 2020, which are hereby incorporated herein by reference in their entireties.

FIELD OF THE INVENTION

The present disclosure relates to a vehicular radar sensor assembly and, more particularly, to a radar sensor assembly for an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door. Door handles may include electronic components, such as sensors for sensing presence of an object exterior the door to, for example, operate an automatic opening function of the door or sense presence of a user exterior the door.

Radar sensors may be used for non-contact object detection in vehicles. Vehicles may include external components such as handles or side light modules that may be used to house one or more components of a radar sensor. However, such external components present several considerations, such as limited packaging space and heat dissipation constraints. Also, radar sensors and associated hardware may generate heat that must be managed to prevent overheating that can adversely impact the operation of the radar sensor and/or other devices.

SUMMARY OF THE INVENTION

A door handle assembly for a door of a vehicle configured to mount at a handle region of a vehicle door includes a handle portion mounted at the handle region of the vehicle door and having a grasping portion configured for a user to grasp when operating the door handle assembly. The handle portion includes an electronic component that, when electrically operated, generates heat at an interior portion of the handle portion. A heat dissipating element or system or device is configured to dissipate heat from the interior portion of the handle portion. The electronic component may comprise a sensor, such as a radar sensor or radar unit.

A vehicular radar sensor assembly includes a radar transceiver which includes an antenna, the antenna being configured for at least one of transmitting or receiving radio frequency (RF) radiation. The radar sensor assembly also includes a heat sink that is in thermal conductivity with the radar transceiver and configured to dissipate heat from the radar transceiver, and the heat sink is configured to allow the RF radiation to pass through the heat sink without functioning as a waveguide for the RF radiation.

The radar sensor assembly is configured to mount at a vehicle and configured to, when operated, sense objects exterior the vehicle includes a sensor printed circuit board (PCB) having a first side and a second side opposite the first side and separated from the first side by a thickness of the sensor PCB. A radar transceiver may be disposed at the first side of the sensor PCB and may include an antenna configured for at least one of transmitting or receiving RF radiation. A heat sink may be in thermal conductivity with the radar transceiver and configured to dissipate heat from the radar transceiver, the radar transceiver disposed or sandwiched between the heat sink and the sensor PCB. When the radar sensor assembly is operated, the RF radiation passes through the heat sink and the heat sink is configured to allow the RF radiation to pass through the heat sink without functioning as a waveguide for the RF radiation. For example, the heat sink may include an aperture therethrough and the antenna may be disposed at or within or aligned or juxtaposed with the aperture to transmit or receive the RF radiation through the aperture. The heat sink may include one or more ramps sloping towards the aperture.

A method of dissipating heat from a radar transceiver includes conducting heat from the radar transceiver to a heat sink in thermally-conductive communication therewith; transmitting the heat, by the heat sink, away from the radar transceiver; and passing RF radiation through the heat sink without guiding the RF radiation.

These and other objects, advantages, purposes and features of the present invention will become apparent upon review of the following specification in conjunction with the drawings.

DESCRIPTION OF THE PREFERRED EMBODIMENTS

Figure 1:
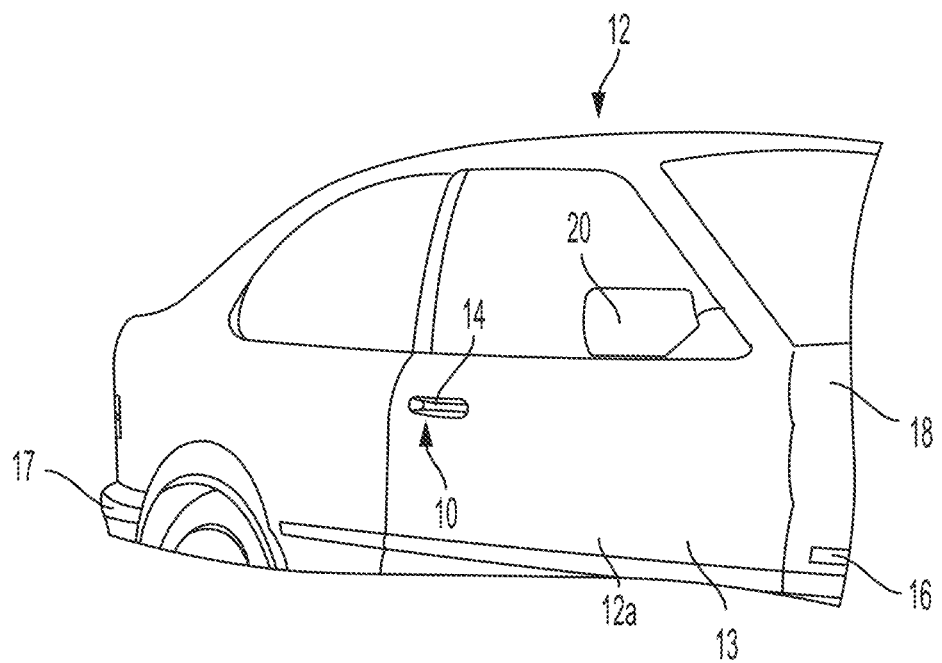
FIG. 1 is a perspective view of a vehicle with a radar sensor and a door handle assembly.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a number of example embodiments of vehicle exterior components that are configured to hold one or more parts of a radar sensor, and which addresses the constraints of limited space and management of heat that is generated by operation of the radar sensor. In some embodiments, the radar sensor includes parts having a maximum operating temperature of 125 degrees C. at an ambient temperature of 80 degrees C. The present disclosure also provides example embodiments that provide water resistance to prevent the radar sensor from being adversely affected by exposure to moisture. The vehicle components may be configured to hold or house or have one or more other electronic components, such as capacitive touch sensors or light modules. Electronic components, such as radar units, often require an environment devoid of extreme temperatures to function properly. Additionally, some vehicle components such as door handles provide a surface frequently grasped and touched by users of the vehicle, who can be harmed if they contact a heated surface. For example, vehicle door handles are typically exposed to the environment (and may be exposed to direct sunlight for extended periods of time) and the operation of one or more electronic components can generate a considerable amount of added heat that is not easily dissipated from the confined interior space of the door handle.

Radar transceivers, such as the AWR 1843AOP transceiver from Texas Instruments, may include transmit and receive antennas within a shared package. Conventional cooling solutions for such radar transceivers may include a back-mounted heat sink mounted to a radar board opposite from the radar transceiver, since placing a conventional heat sink in front of the radar antennas could obstruct RF waves from being transmitted to and from the radar antennas. Due to packaging limitations, such back-mounted heat sinks may not be sufficient to provide adequate cooling for the radar board.

Referring now to the drawings and the illustrative embodiments depicted therein, an example motor vehicle 12 is shown to include a side door 12a having an outer panel 13 with a vehicle door handle assembly 10 disposed thereupon (FIG. 1). A side light module 16 also extends from a vehicle side 18. The vehicle door handle assembly 10 is mountable to the door 12a of the vehicle 12 and operable to release a latch mechanism (not shown) of the door 12a to open the vehicle door. The door handle assembly 10 includes a handle portion 14 that is disposed at the door and that is fixedly mounted at the door or to a bracket mounted to the door. The handle portion may be movably mounted at the handle region of the vehicle door (such as pivotally mounted), whereby movement of the handle portion by a user opens the vehicle door. As discussed below, the door handle assembly 10 may include electronic components (such as a radar unit) disposed within the handle portion 14 and the electronic components may generate heat when operating. Thus, the door handle assembly 10 also includes a cooling or heat dissipating aspect or feature or function to cool or dissipate heat from the electronic component and/or a surface of the handle portion. As also discussed below, the radar sensor may be disposed within or at or behind one or more vehicular components or positions at or near the exterior surface of the vehicle for sensing an area or region exterior the vehicle.

Figure 1A:
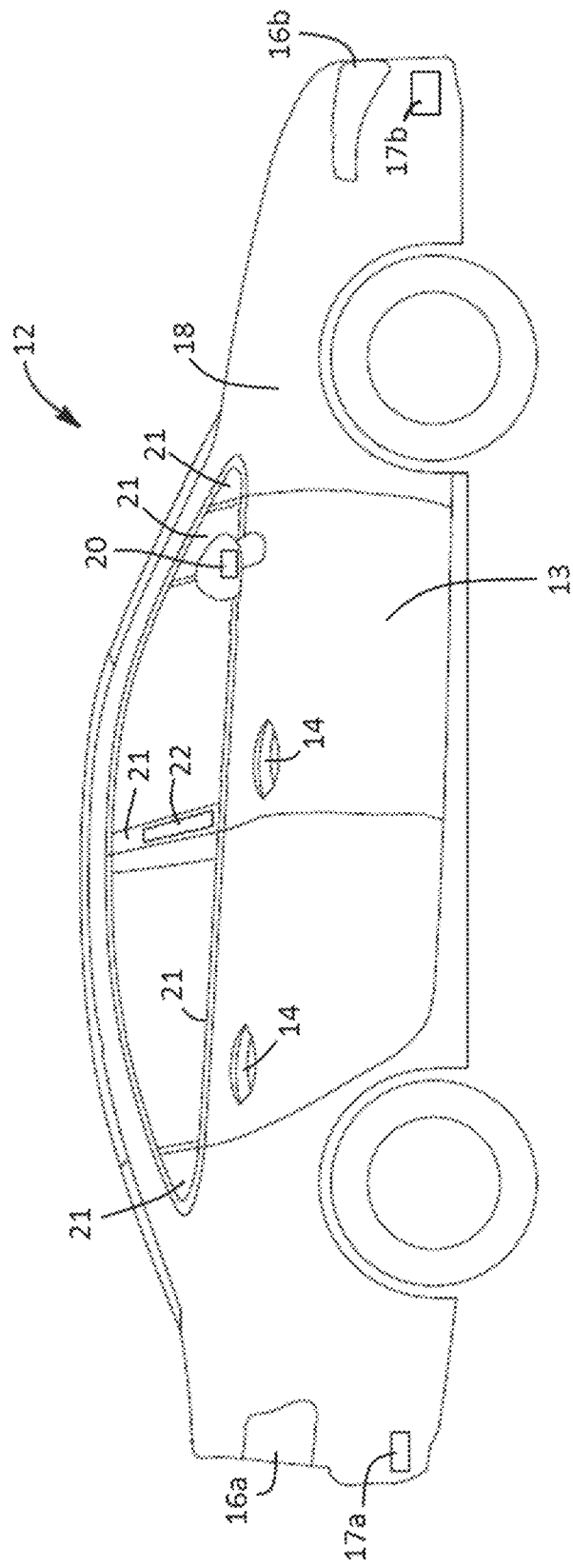
FIG. 1A is a side view of the vehicle of FIG. 1.

FIG. 1A shows a side view of the example motor vehicle 12 including a tail light assembly 16b, a headlight assembly 16b, a rear bumper 17a, a front bumper 17b, a side mirror assembly 20, various trim pieces 21, and an applique 22, such as a keypad mounted to a pillar of a door. In other words, the example motor vehicle 12 includes several vehicle exterior components 13, 14, 16, 16a, 16b, 17a, 17b, 20, 21, 22 that may be used to hold one or more components of a radar sensor. Other exterior components 13, 14, 16, 16a, 16b, 17a, 17b, 20, 21, 22 besides those listed explicitly above may also hold one or more components of the radar sensor and may incorporate one or more aspects of the designs shown in the present disclosure. For example, the exterior component may take the form of a body panel, a trim panel, and/or a roof-mounted structure, such as an antenna pod or a luggage rail.

In some embodiments, a radar sensor disposed within one or more exterior components 13, 14, 16, 16a, 16b, 17a, 17b, 20, 21, 22 may be used for non-contact object detection (NCOD), such as, for example, to sense a user approaching and/or interacting with a closure such as the side door 12a or a tailgate or lift gate of the vehicle 12. In some embodiments, the radar sensor disposed within one or more exterior components 13, 14, 16, 16a, 16b, 17a, 17b, 20, 21, 22 may be used for an advanced driver-assistance system (ADAS) such as, for example, to sense the position of other vehicles, objects, or terrain while the vehicle 12 is in motion.

Figure 2:
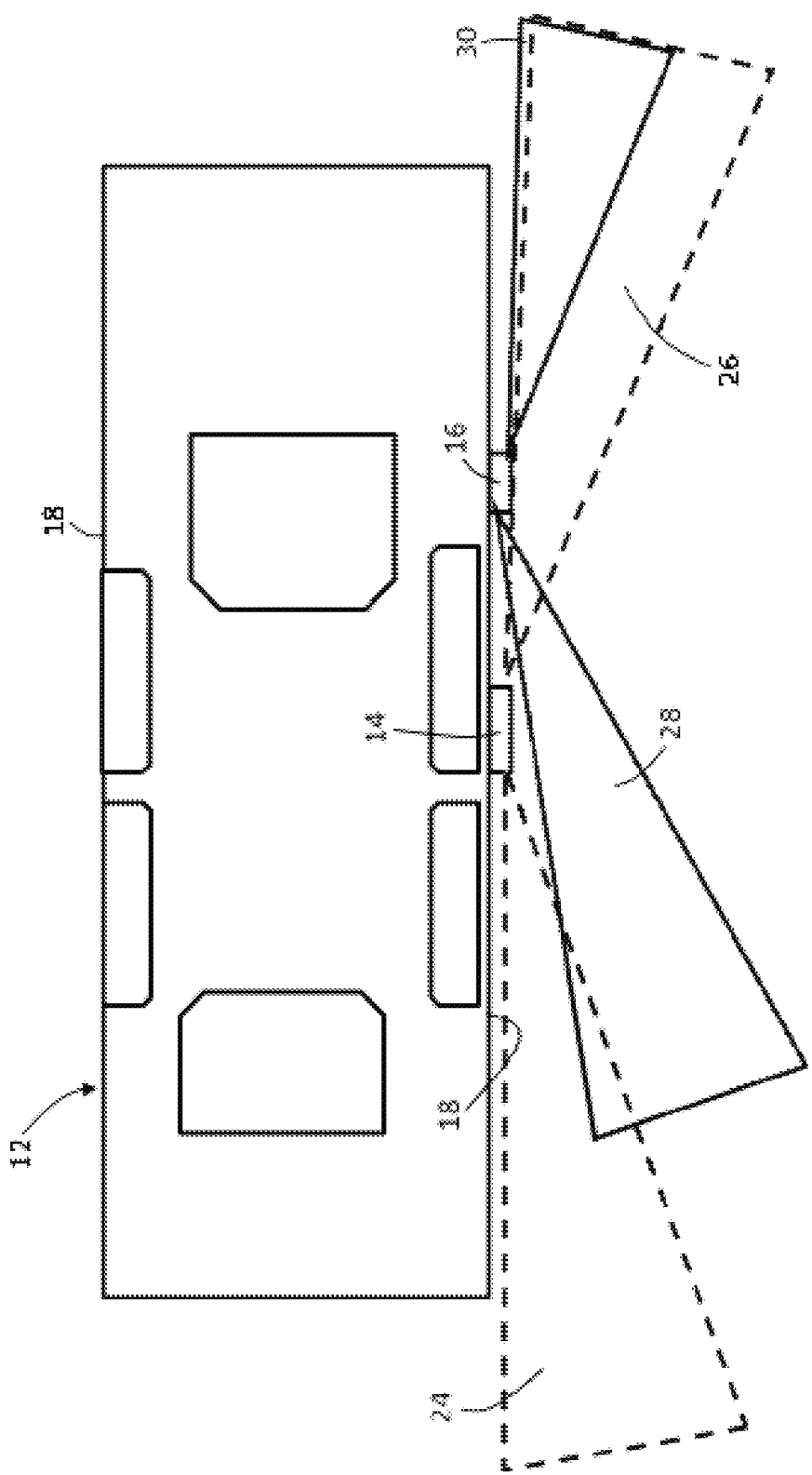
FIG. 2 is a schematic diagram of the vehicle showing fields of sensing or fields of view of radar sensors at the vehicle.

As shown in FIG. 2, the vehicle 12 includes a radar sensor at the handle portion 14 having a first field of sensing or field of view (FOV) 24 that extends in a rearward direction along the side 18 of the vehicle 12, and a second field of sensing or field of view 26 that extends in a forward direction along the side 18 of the vehicle 12. Similarly, a radar sensor at the side light module 16 has a third field of sensing or field of view 28 that extends in a rearward direction along the side 18 of the vehicle 12, and a fourth field of sensing or field of view 30 that extends in a forward direction along the side 18 of the vehicle 12. One or more of the fields of sensing or view may angle away from the side 18 of the vehicle 12, at least to some extent as a result of obstruction by one or more other vehicle exterior components.

Figure 3:
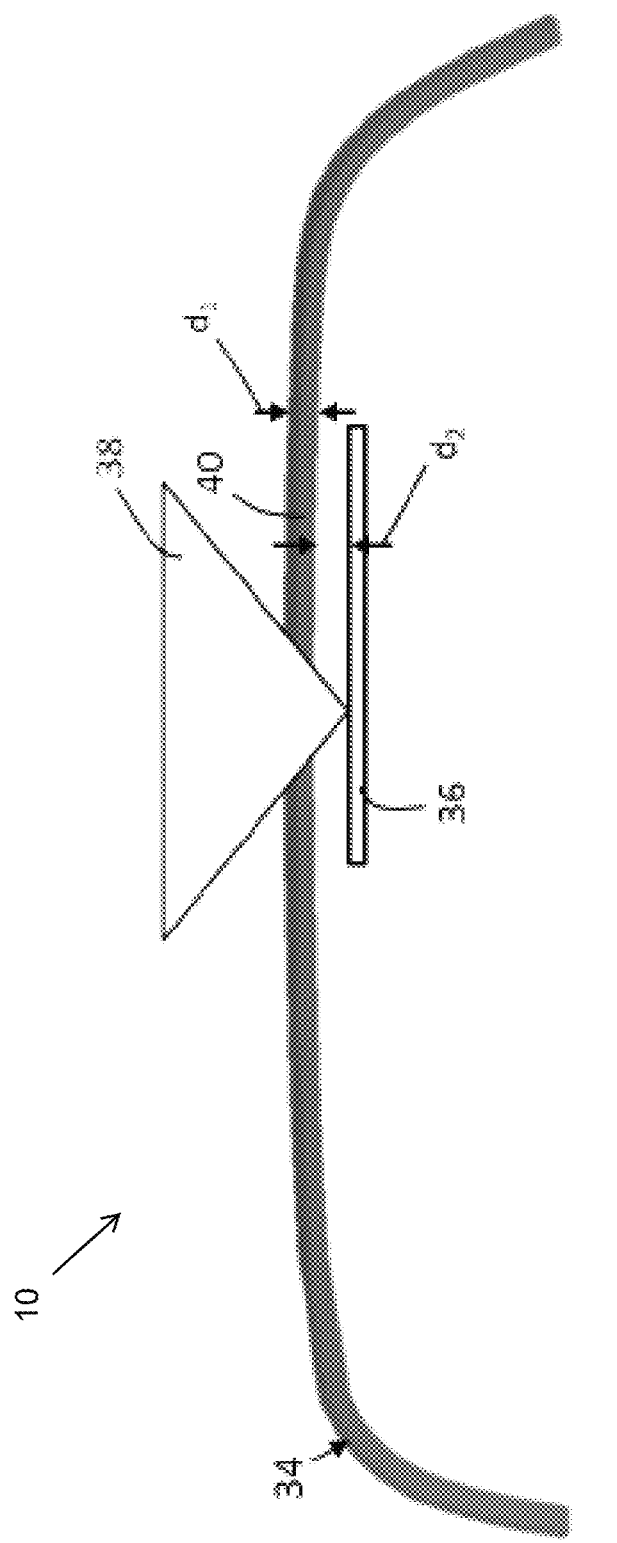
FIGS. 3 and 3A are schematic diagrams of a handle portion of the door handle assembly with the radar sensor disposed thereat.

As shown in FIG. 3, the handle assembly 10 includes a handle cover 34 with radar assembly having a radar transceiver 36 disposed therein and configured to generate and transmit radio frequency (RF) radiation 38 through the handle cover 34. Specifically, the RF radiation 38 propagates through a portion of the handle cover 34, which may be called a radome region 40. In order to optimize transmission of the RF radiation 38 through the handle cover 34, the radome region 40 may be configured to have a thickness with a predetermined first distance $d_1$ or an integer (n) multiple of the predetermined first distance $d_1$. The predetermined first distance $d_1$ may be determined to maximize radar transmission through the radome region 40. Likewise, the radar transceiver 36 may be spaced apart from the radome region 40 by a predetermined second distance $d_2$ or an integer (n) multiple of the predetermined second distance $d_2$ to optimize transmission of the RF radiation 38 through the handle cover 34. While radar assembly is shown as embodied in the door handle assembly, radar assembly may be provided within other types of housings, such as appliques, as a standalone radar module, integrated within a headlight or taillight assembly, within an inside mirror, or other confined spaces. In a possible configuration, the front-mounted heat sink 60 described herein below may act as part of the housing.

Figure 3A:
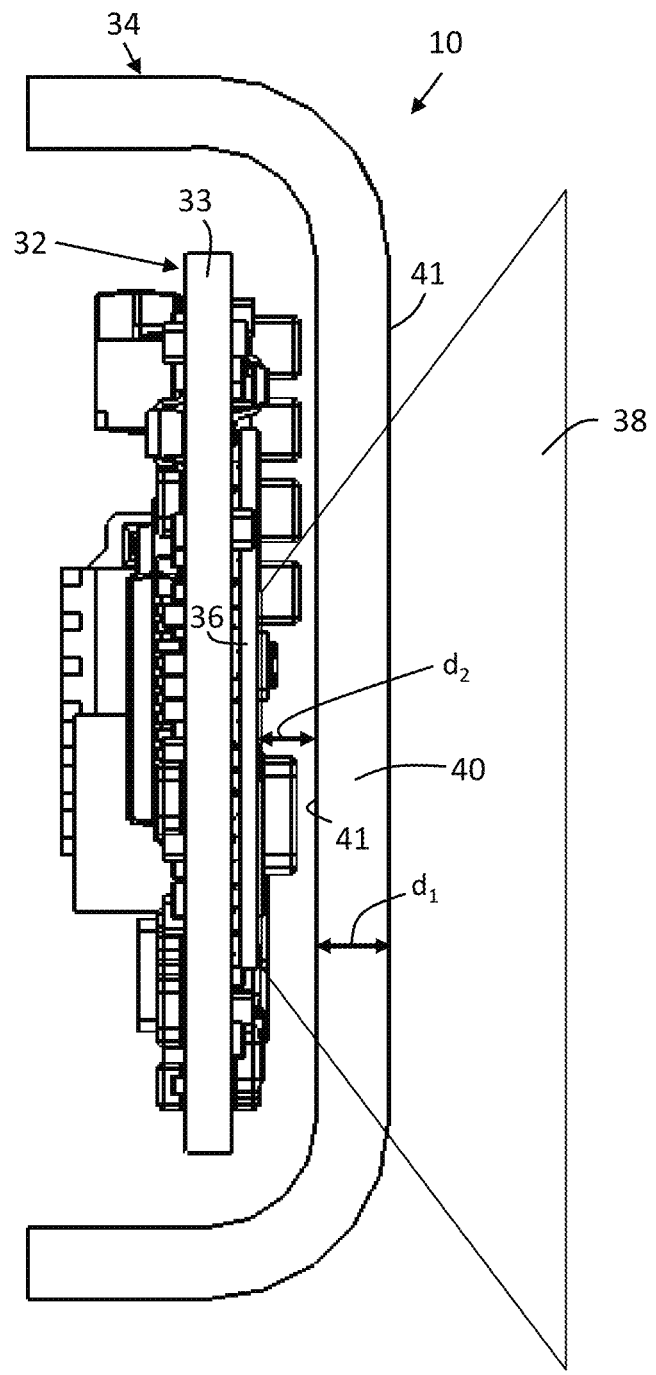

As shown in FIG. 3A, the handle assembly 10 includes a radar module 32 disposed within the handle cover 34. The radar module 32 includes a sensor printed circuit board (PCB) 33 with several electric components, including a radar transceiver 36, mounted thereto. The sensor PCB 33 may provide power to the radar transceiver 36. The sensor PCB 33 may perform other tasks, such as signal processing, and communication of information between the radar transceiver and external devices. The radome region 40 includes flat surfaces 41 extending parallel to the radar transceiver 36 and parallel to one another and spaced apart from one another by the predetermined first distance $d_1$. The radome region 40 is spaced apart from the radar transceiver 36 by an air gap having the predetermined second distance $d_2$.

Figure 3B:
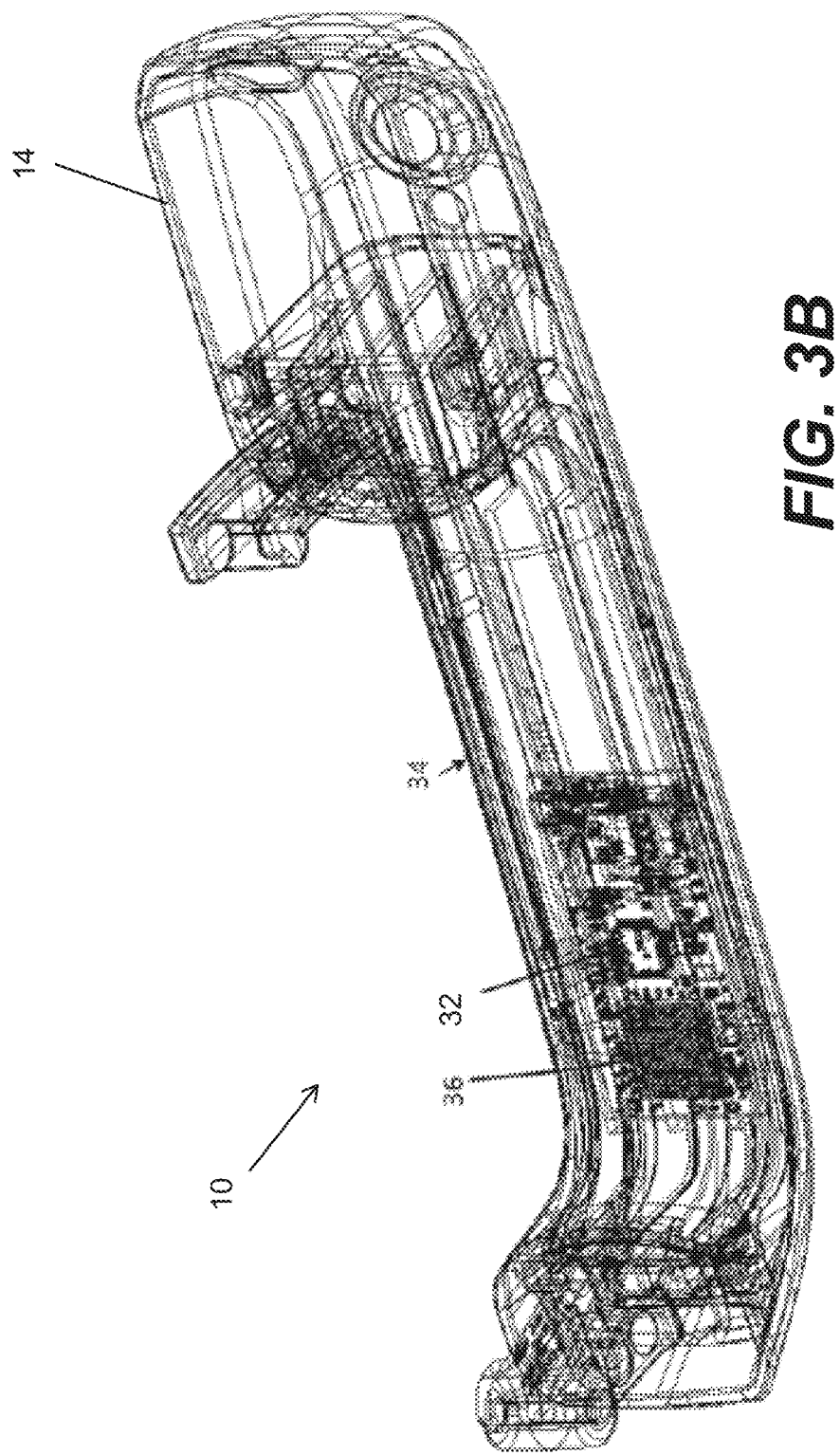
FIG. 3B is a perspective view of the door handle assembly.
Figure 4:
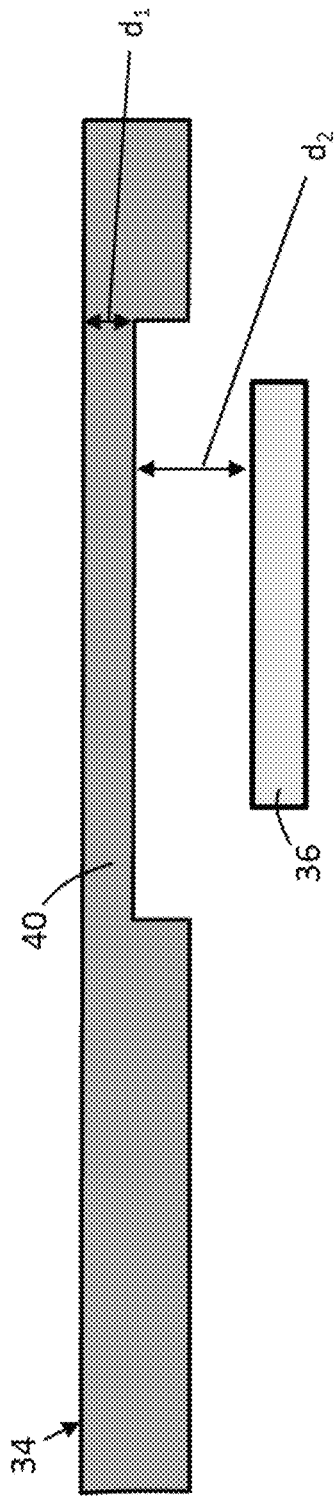
FIGS. 4 and 5 are schematic diagrams of the handle portion of the door handle assembly.

As shown in FIG. 3B, the handle assembly 10 includes the radar module 32 disposed within the handle cover 34, mounted near a front of the handle portion 14, with the radar transceiver 36 angled slightly forwards and downwards. As shown in FIG. 4, the radome region 40 may be thinner than other regions of the handle cover 34 outside of the radome region 40.

Figure 5:
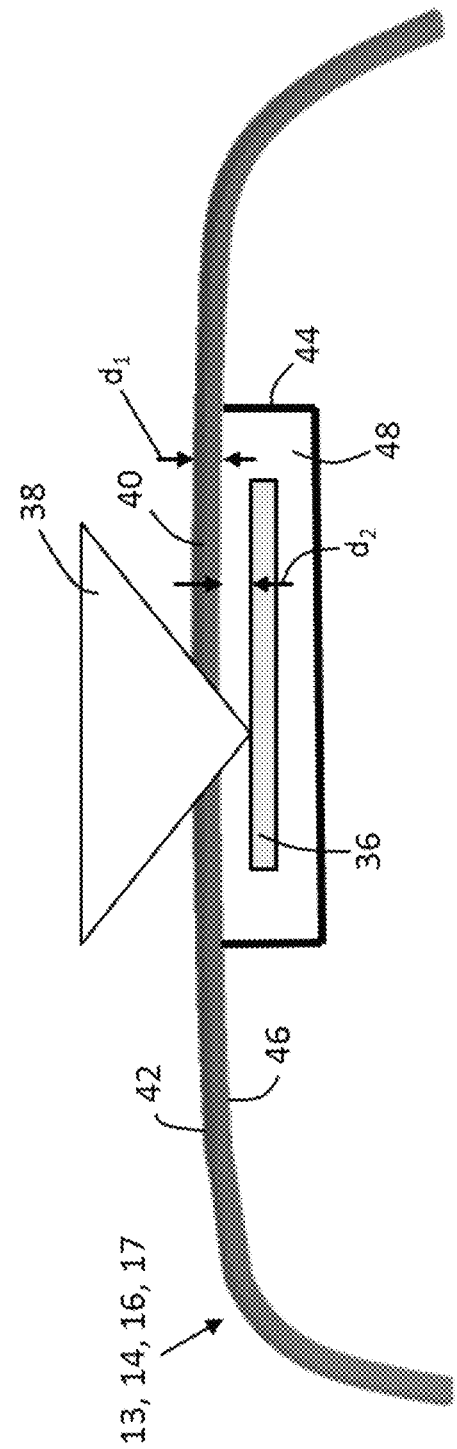

As shown in FIG. 5, the vehicle exterior component 13, 14, 16, 17 includes a class-A surface 42 that is intended to be directly viewed and/or touched by a user. In other words, the radome 40 includes the class-A surface 42, so there is no air gap between the radome 40 and the class-A surface 42. A housing 44 is sealed against an interior surface 46 opposite the class-A surface 42. The housing 44 defines an interior space 48 configured to hold the radar transceiver 36. The housing 44 may be configured to be watertight to prevent moisture from affecting the radar transceiver 36.

Figure 6:
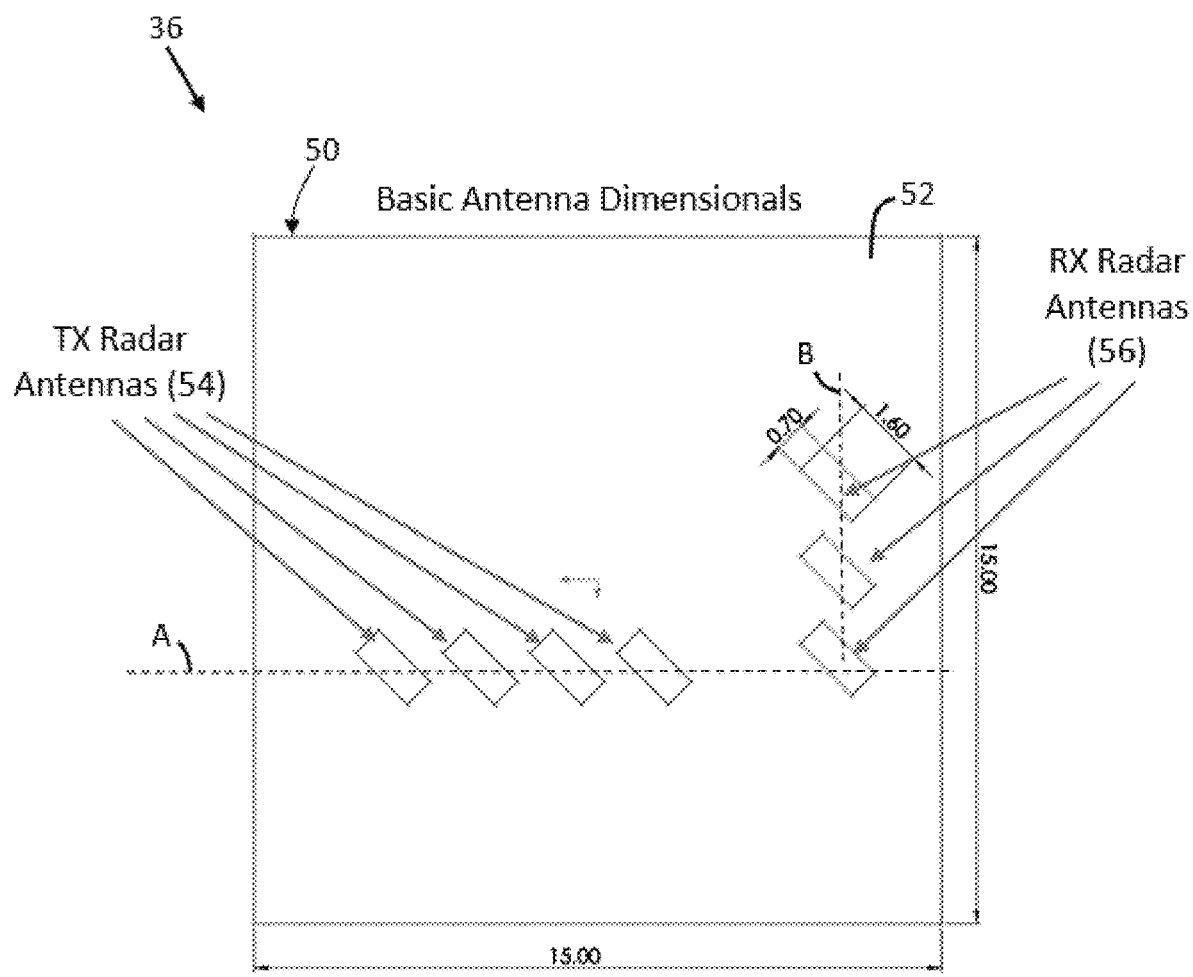
FIG. 6 is a front plan view of a radar transceiver of the radar sensor.

As shown in FIG. 6, the radar transceiver 36 includes a substrate 50 having a square shape with a flat front surface 52. For example the substrate 50 may have length and width dimensions of 15 mm by 15 mm. The substrate 50 may be a printed circuit board (PCB), semiconductor or semiconductor package material, such as plastic or ceramic. The substrate 50 may comprise any suitable size and/or shape, and the substrate 50 may be made of a different material. The radar transceiver 36 may include, for example, an AWR 1843AOP device from Texas Instruments.

The radar transceiver 36 includes a set of four radar transmitting antennas 54, which may be called TX antennas, and which are configured to transmit radio frequency (RF) radiation, and particularly RF radiation at radar frequencies, such as 76- to 81-GHz. Each of the radar transmitting antennas 54 is disposed on or flush with the flat front surface 52 of the substrate 50. The radar transmitting antennas 54 each have a rectangular shape and are disposed along a first axis A, which extends parallel to an edge of the substrate 50. The rectangular shape of each of the radar transmitting antennas 54 defines a major axis (i.e. the longer one of a length or width thereof) that is tilted at an oblique angle, such as 45 degrees, with respect to the first axis A. The radar transceiver 36 includes a set of three radar receiving antennas 56, which may be called RX antennas, and which are configured to receive radio frequency (RF) radiation, and particularly RF radiation at radar frequencies, such as 76- to 81-GHz. Each of the radar receiving antennas 56 is disposed on or flush with the flat front surface 52 of the substrate 50. The radar receiving antennas 56 each have a rectangular shape and are disposed along a second axis B, which extends perpendicularly to the first axis A. One of the radar receiving antennas 56 is located at the intersection of the first axis A and the second axis B. The rectangular shape of each of the radar receiving antennas 56 defines a major axis that is parallel to the major axes of the of each of the radar transmitting antennas 54, and which is tilted at an oblique angle, such as 45 degrees, with respect to the second axis B. It should be appreciated that these are merely examples, and the radar transceiver 36 may have any suitable number of radar transmitting antennas 54 and any suitable number of radar receiving antennas 56, which may have any suitable configuration and/or orientation than is shown in FIG. 6. Furthermore, one or more radar antennas 54, 56 may function as both a radar transmitting antenna 54, and as a radar receiving antennas 56.

The radar transceiver 36 may include other components mounted on and/or or within the substrate 50. Such other components may include electronic components, such as amplifiers and/or signal processors for generating and/or processing signals to and from the radar antennas 54, 56. The radar antennas 54, 56 and/or the other components may generate heat during their operation. Such heat may need to be dissipated away from the radar transceiver 36 in order to keep the radar transceiver 36 within an operational temperature range.

FIGS. 7A-7D show a front-mounted heat sink 60 configured to be mounted to the flat front surface 52 of the radar transceiver 36. The front-mounted heat sink 60 may be made from one or more pieces of metal, such as Aluminum or Copper, for conducting heat away from the radar transceiver 36. The front-mounted heat sink 60 may be configured to pass the RF radiation through the heat sink without guiding the RF radiation. In other words, the front-mounted heat sink 60 may include geometry and/or materials that do not reflect or otherwise guide or direct the RF radiation to or from the radar antennas 54, 56.

Figure 7A:
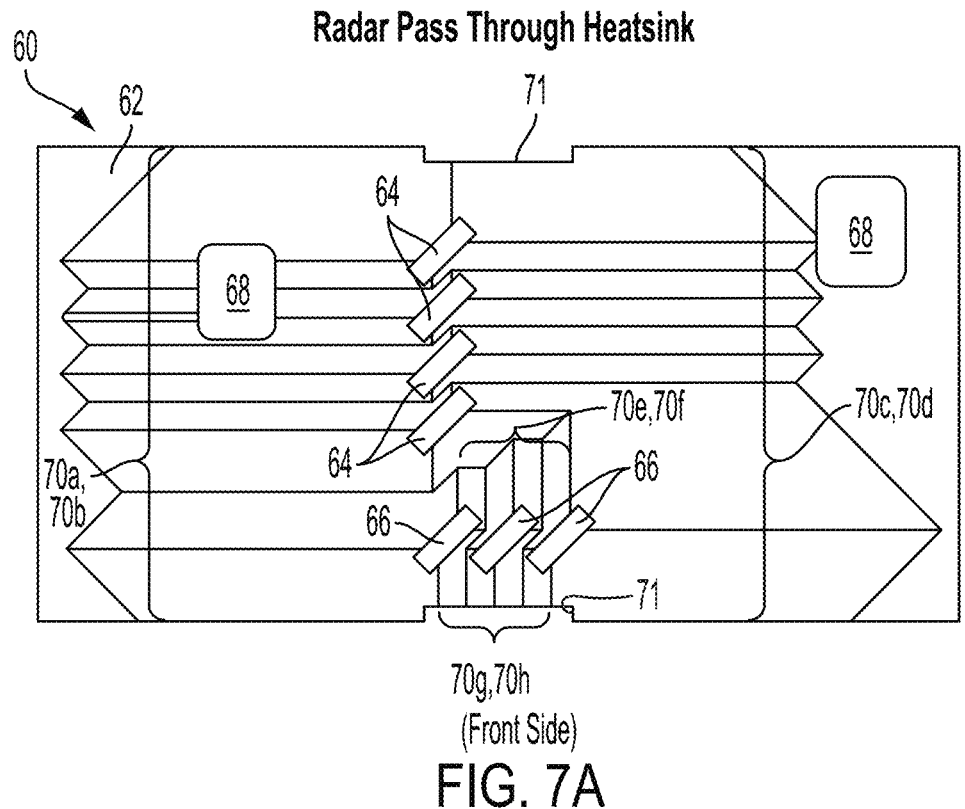
FIG. 7A is a front plan view of a heat sink configured to mount at the front side of the radar sensor.
Figure 7B:
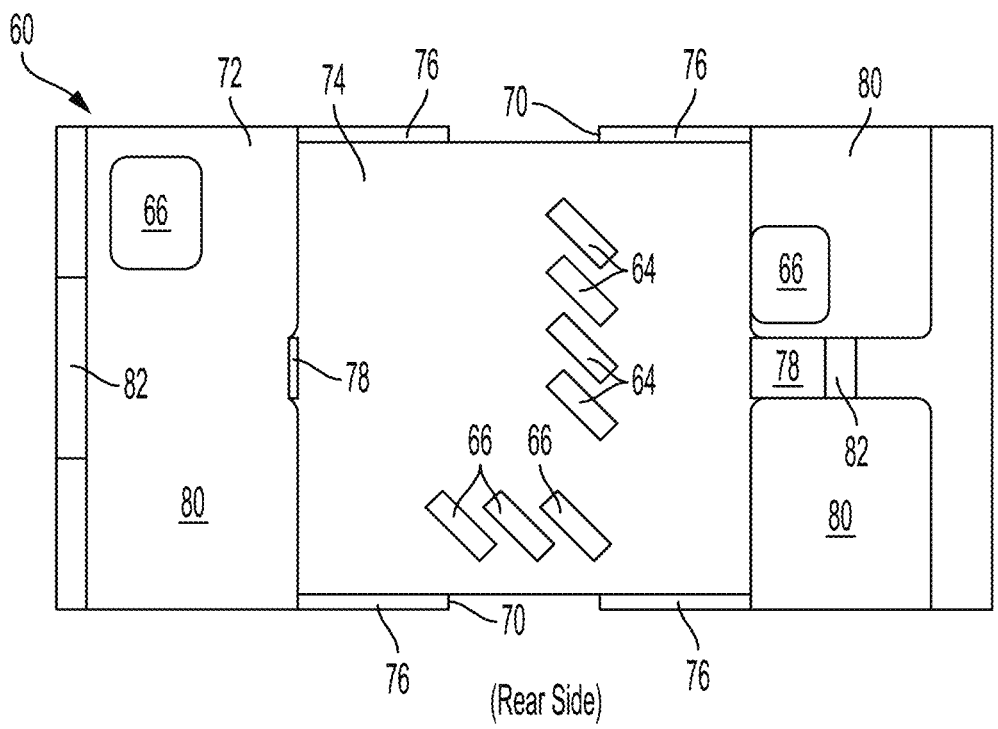
FIG. 7B is a rear plan view of the heat sink.

As shown in FIG. 7A, the front-mounted heat sink 60 may have a generally rectangular shape including a front side 62 that is configured to face outwardly and away from the radar transceiver 36 when the front-mounted heat sink 60 is mounted to the radar transceiver 36. As shown in FIGS. 7B and 7D, the front mounted heat sink 60 includes a rear side 72 opposite of the front side 62. The front-mounted heat sink 60 may include a set of first apertures 64 each having a shape, size, and position to overlie corresponding ones of the radar transmitting antennas 54 for RF radiation to pass through unimpeded. The front-mounted heat sink 60 may further include a set of second apertures 66 having a shape, size, and position to overlie corresponding ones of the radar receiving antennas 56 for RF radiation to pass through unimpeded. The front-mounted heat sink 60 may also include a set of third apertures 68 each having a shape, size, and position to overlie corresponding components of the radar module 32, such as a tall electrical component mounted to the sensor PCB 33 and/or a port or plug or other component that requires access for use or maintenance. The apertures extend from the front side 62 to the rear side 72 and any or all of the apertures 64, 66, 68 may have a quantity, size, shape, and/or position that is different from the example arrangement shown in FIGS. 7A-7D.

Figure 7C:
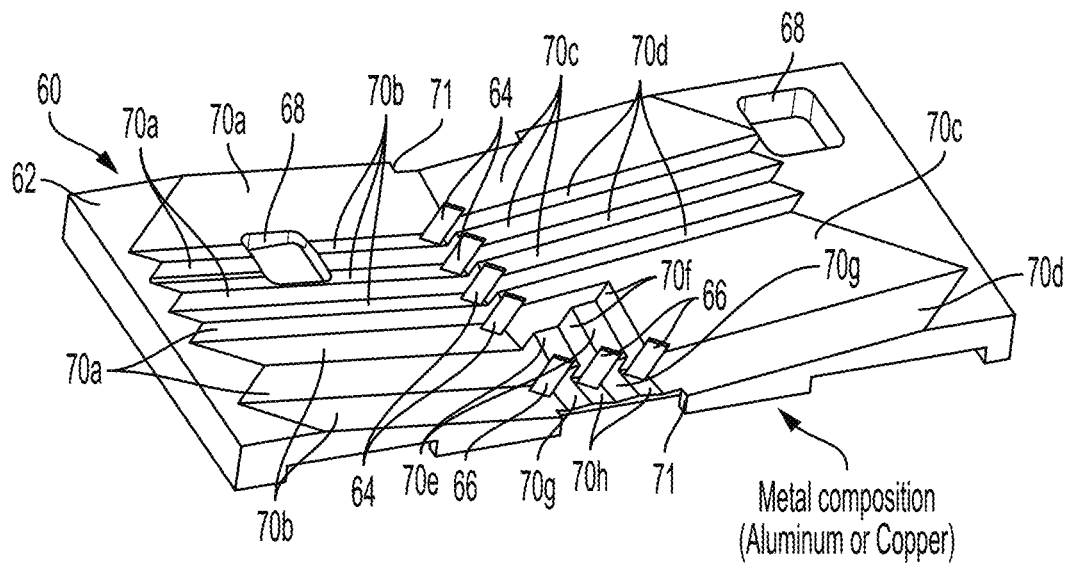
FIGS. 7C and 7D are perspective views of the heat sink.
Figure 7D:
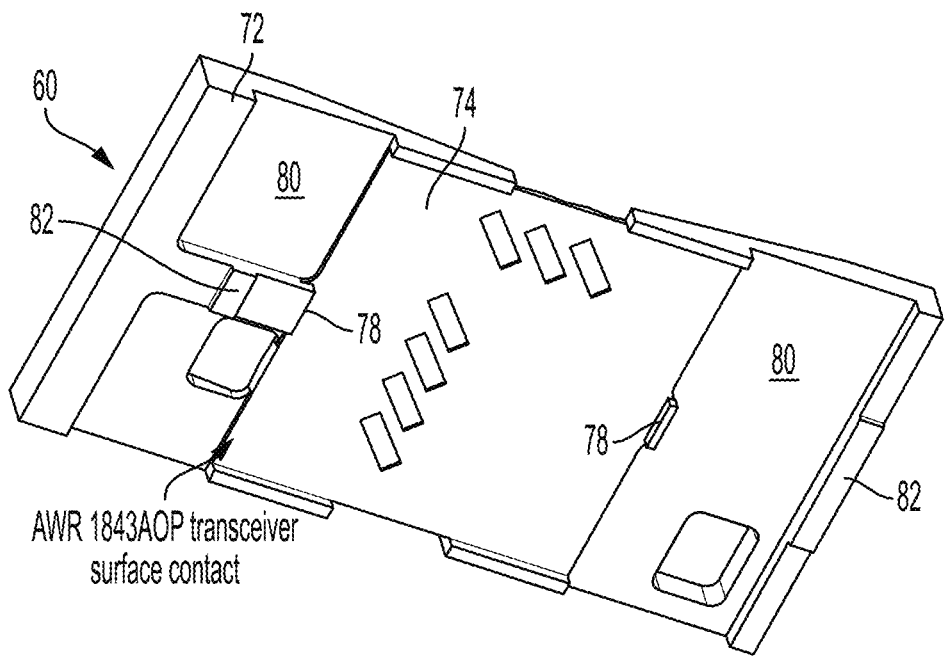

As shown in FIGS. 7A and 7C, the front side 62 of the front-mounted heat sink 60 may define a set of first ramps 70*a* and a set of second ramps 70*b* that each slope toward corresponding ones of the first apertures 64. One of the first ramps 70*a* and a corresponding one of the second ramps 70*b* together define a V-shaped groove that slopes downwardly toward a corresponding one of the first apertures 64, where the front-mounted heat sink 60 may have a small or thin or slim or reduced thickness. The front side 62 of the front-mounted heat sink 60 may also define a set of third ramps 70*c* and a set of fourth ramps 70*d* that each slope toward corresponding ones of the first apertures 64, from a side opposite from the first and second ramps 70*a*, 70*b*. One of the third ramps 70*c* and a corresponding one of the fourth ramps 70*d* together define a V-shaped groove that slopes downwardly toward a corresponding one of the first apertures 64, where the front-mounted heat sink 60 may have a small or thin or slim or reduced thickness. The V-shaped grooves defined by each of the first and second ramps 70*a*, 70*b*, and the third and fourth ramps 70*c*, 70*d* may each extend parallel to a major axis of the front-mounted heat sink 60. Together, the first ramps 70*a*, second ramps 70*b*, third ramps 70*c*, and fourth ramps 70*d* provide clearance for RF radiation to be transmitted from the transmitting antennas 54, unimpeded. In other words, the ramps 70*a*-70*d* allow the RF radiation to pass through the front-mounted heat sink 60 without guiding the RF radiation. The front side 62 of the front-mounted heat sink 60 may define a set of fifth ramps 70*e* and a set of sixth ramps 70*f* that each slope toward corresponding ones of the second apertures 66. One of the fifth ramps 70*e* and a corresponding one of the sixth ramps 70*f* together define a V-shaped groove that slopes downwardly toward a corresponding one of the second apertures 66, where the front-mounted heat sink 60 may have a small or thin or slim or reduced thickness. The front side 62 of the front-mounted heat sink 60 may define a set of seventh ramps 70*g* and a set of eighth ramps 70*h* that each slope toward corresponding ones of the second apertures 66, from a side opposite from the fifth and sixth ramps 70*e*, 70*f*. One of the seventh ramps 70*g* and a corresponding one of the eighth ramps 70*h* together define a V-shaped groove that slopes downwardly toward a corresponding one of the second apertures 66, where the front-mounted heat sink 60 may have a small or thin or slim or reduced thickness. The V-shaped grooves defined by each of the fifth and sixth ramps 70*e*, 70*f*, and the seventh and eighth ramps 70*g*, 70*h* each extend perpendicular to the major axis of the front-mounted heat sink 60. Together, the fifth ramps 70*e*, sixth ramps 70*f*, seventh ramps 70*g*, and eighth ramps 70*h* provide clearance for RF radiation to be transmitted to the receiving antennas 56, unimpeded. In other words, the ramps 70*e*-70*h* allow the RF radiation to pass through the front-mounted heat sink 60 without guiding the RF radiation.

A slot 71 for receiving a clamp, such as a spring clamp, for holding the front-mounted heat sink 60 in contact with the radar transceiver 36 may be disposed along each longside edge of the front mounted heat sink 60. The rear side 72 may include a flat plate 74 having a size and shape configured to be flush against the flat front surface 52 of the substrate 50 of the radar transceiver 36 for conducting heat away from the radar transceiver 36. The front-mounted heat sink 60 may include side walls 76 configured to engage side edges of the substrate 50 of the radar transceiver 36 for holding the substrate 50 in a precise alignment with the front-mounted heat sink 60. The front-mounted heat sink 60 may include integrated clips 78 for holding corresponding side edges of the substrate 50 of the radar transceiver 36. The integrated clips 78 may provide a biasing force to press the substrate 50 against the flat plate 74 of the front-mounted heat sink 60 to maintain good thermal conductivity therebetween.

The rear side 72 of the front-mounted heat sink 60 may define a plurality of raised regions 80 configured to accommodate corresponding electrical devices mounted to the sensor PCB 33. The rear side 72 of the front-mounted heat sink 60 may include stand-offs that each define a flat surface that are parallel to one another and which are farthest from the front side 62. The standoffs 82 may be configured to engage the sensor PCB 33 and to distribute pressing force to the sensor PCB 33, preventing excessive force from being applied to the radar transceiver 36.

Figure 8:
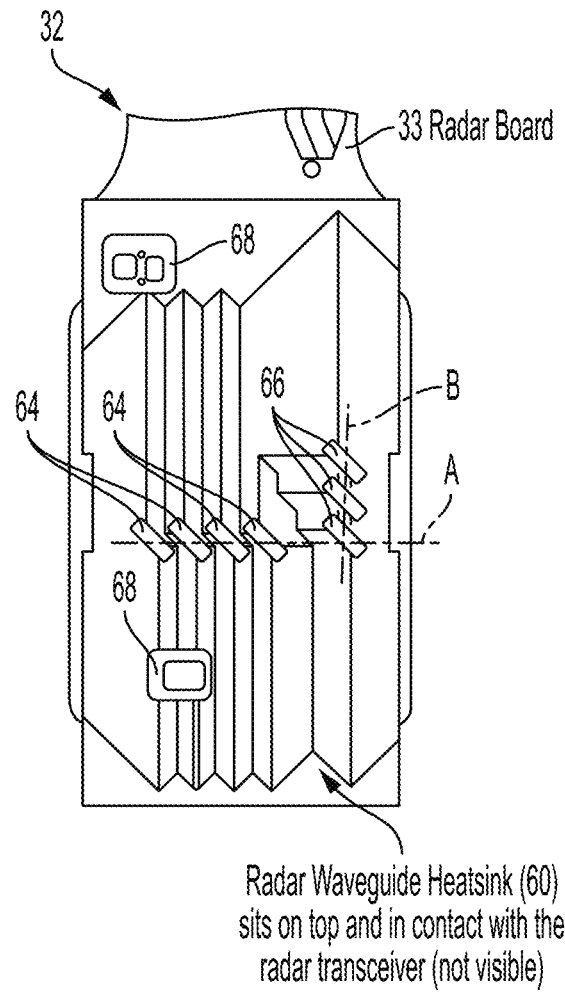
FIG. 8 is a front view of the radar sensor with the front-mounted heat sink.
Figure 9:
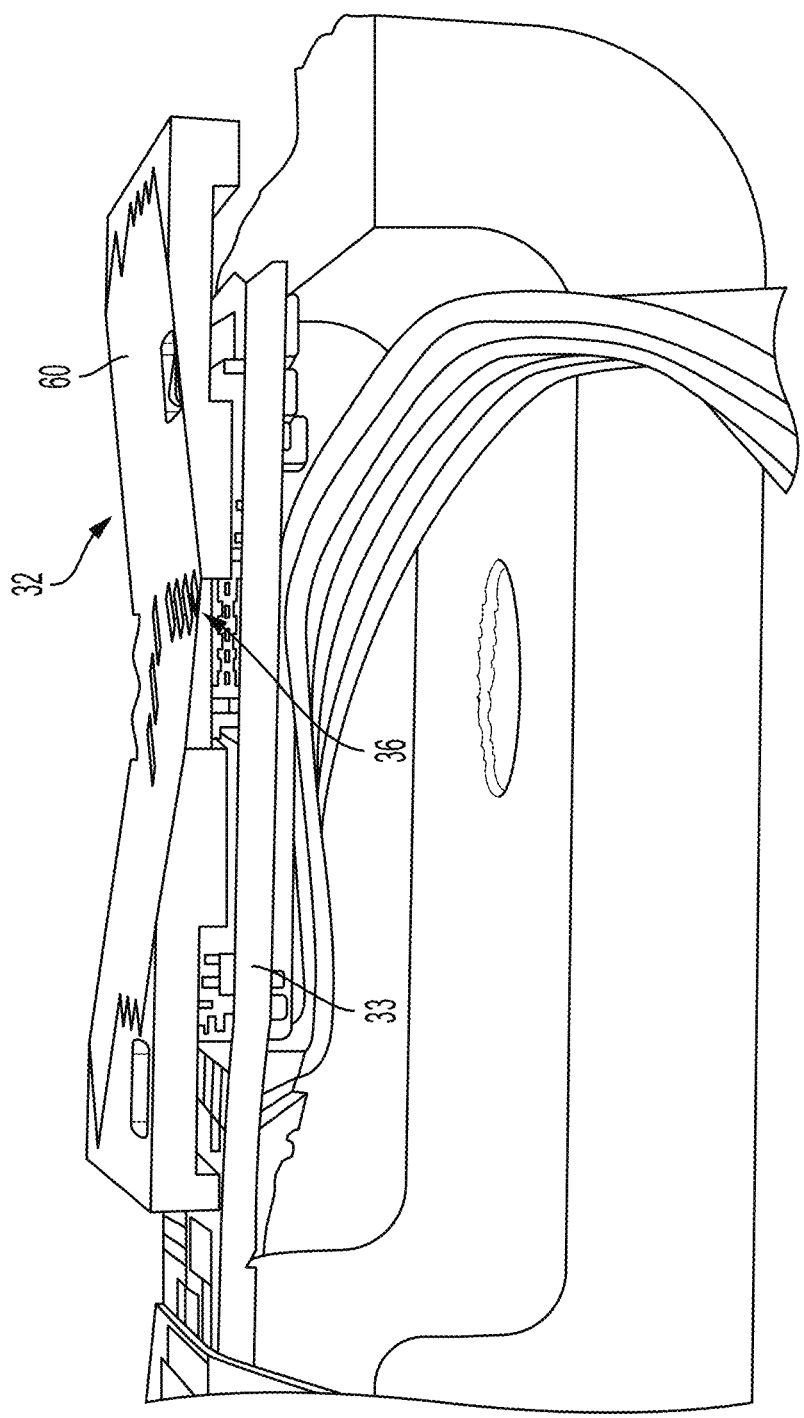
FIG. 9 is a side view of the radar sensor with the front-mounted heat sink.

As shown in FIGS. 8 and 9, the radar sensor includes the front-mounted heat sink 60, including the first and second apertures 64, 66 for transmitting RF radiation therethrough, and the third apertures 68 for accommodating components on the sensor PCB 33. One or more of the third apertures 68 may provide access to a corresponding location on the sensor PCB 33, for accessing a test port, a status indicator, a wiring connection, or for any another purpose.

Figure 10A:
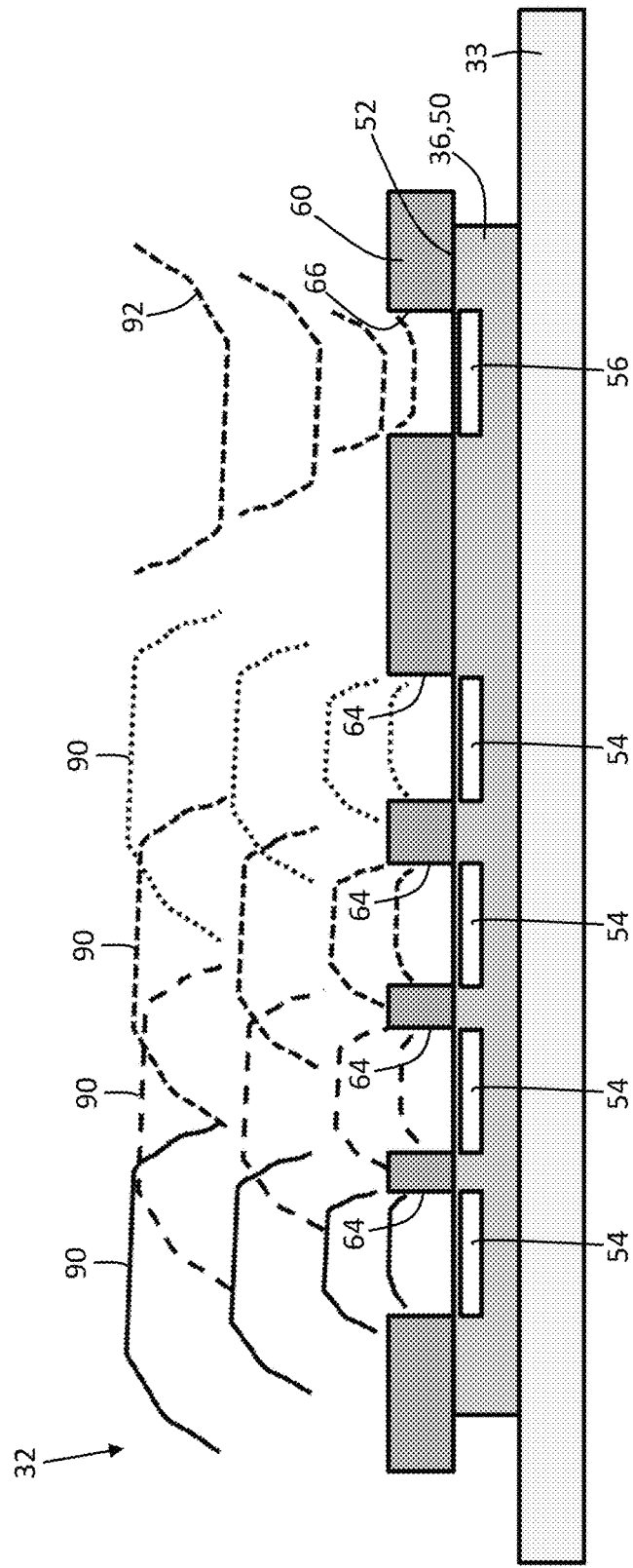
FIGS. 10A and 10B are schematic diagrams of the radar transceiver with the front-mounted heat sink, showing a transmission of radio frequency (RF) radiation to and from antenna of the radar transceiver.

As shown in FIG. 10A, transmitted RF radiation 90 from the radar transmitting antennas 54 passes unimpeded through the first apertures 64 of the front-mounted heat sink 60, without being guided or otherwise disturbed by the front-mounted heat sink 60. As illustrated, received RF radiation 92 passes unimpeded through the second apertures 66 of the front-mounted heat sink 60 to one of the radar receiving antennas 56, without being guided or otherwise disturbed by the front-mounted heat sink 60.

Figure 10B:
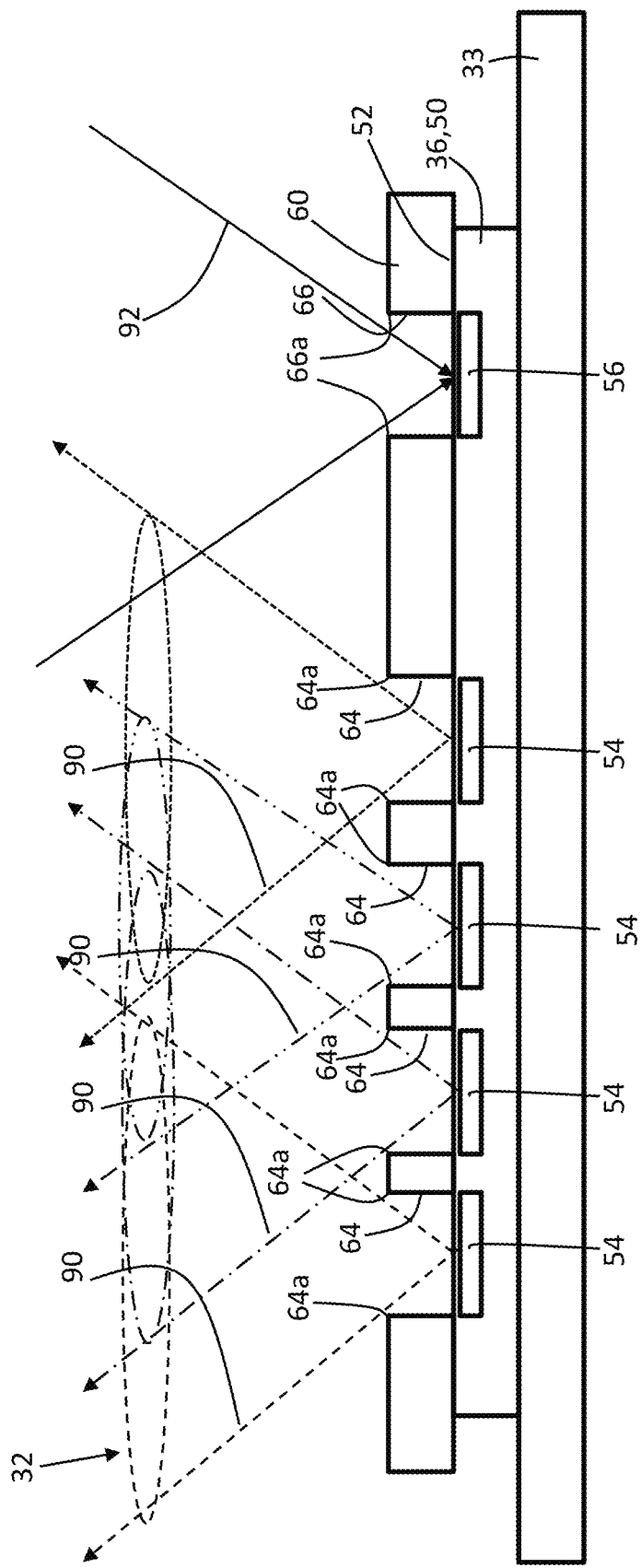
Figure 10C:
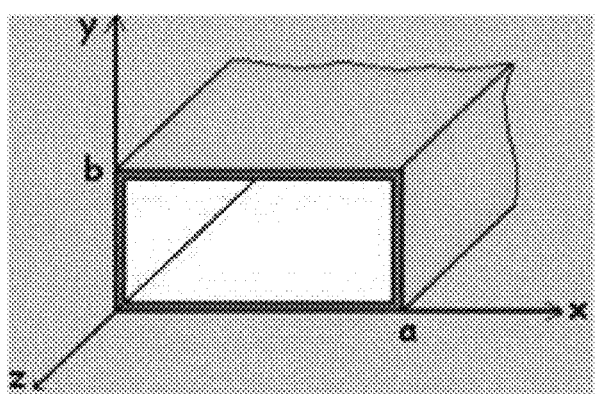
FIG. 10C is a plot demonstrating the relationship for determining the maximum height of apertures in the front-mounted heat sink without interfering or guiding the RF radiation.

FIG. 10B illustrates the electromagnetic waves 90 in a diagrammatically simplified form as a conical shape emitted from transmitting antennas 54 and expanding outwardly and electromagnetic waves 92 in a diagrammatically simplified form as a conical shape being received by radar receiving antennas 56, where the aperture 64, 66 is aligned with the antenna 54, 56 and is configured as narrow as possible so as not to affect the field of the conically shaped emitted electromagnetic wave 90. In other words, the aperture is configured, and the height of the aperture 64 is configured so that terminal ends 64*a* of the aperture do not affect the propagation of the waves 90 outwardly, for example by being positioned so as to cause a reflection of the waves 90 when contacting the terminal ends 64*a*. As a result, a heat sink structure may be provided which does not block the field of sensing or view of the antennas 54, 56 over a conically shaped propagation volume, for example, prior to the waves 90 exiting the aperture 64. Similarly, the field of sensing or view of the receiving antenna 56 is optimized for a maximized field of sensing or view by configuration terminal ends 64*b* of aperture 66. For example, the height of the aperture 64, 66 may be calculated so as not to act as a waveguide according to the below formula and with reference to FIG. 10C such that the frequency of the waves 90, 92 are not cut off due to the dimensions of the aperture 64, 66:

$$f_c = \frac{1}{2a\sqrt{\mu\epsilon}} = \frac{c}{2a}$$

Fc is the cut-off frequency, C is the speed of light, $\mu$ is the permeability of a material within or covering the heat sink 60 (or otherwise within the field of sensing or view of the antennas), for example the material may comprise air or foam inserted in apertures 64, 66, and $\epsilon$ may be the permittivity of another material within or covering the heat sink 60, for example air or foam inserted in apertures 64, 66. In some configurations, waves 90, 92 may slightly impinge on terminal ends 64*a*, 64*b*.

Figure 11:
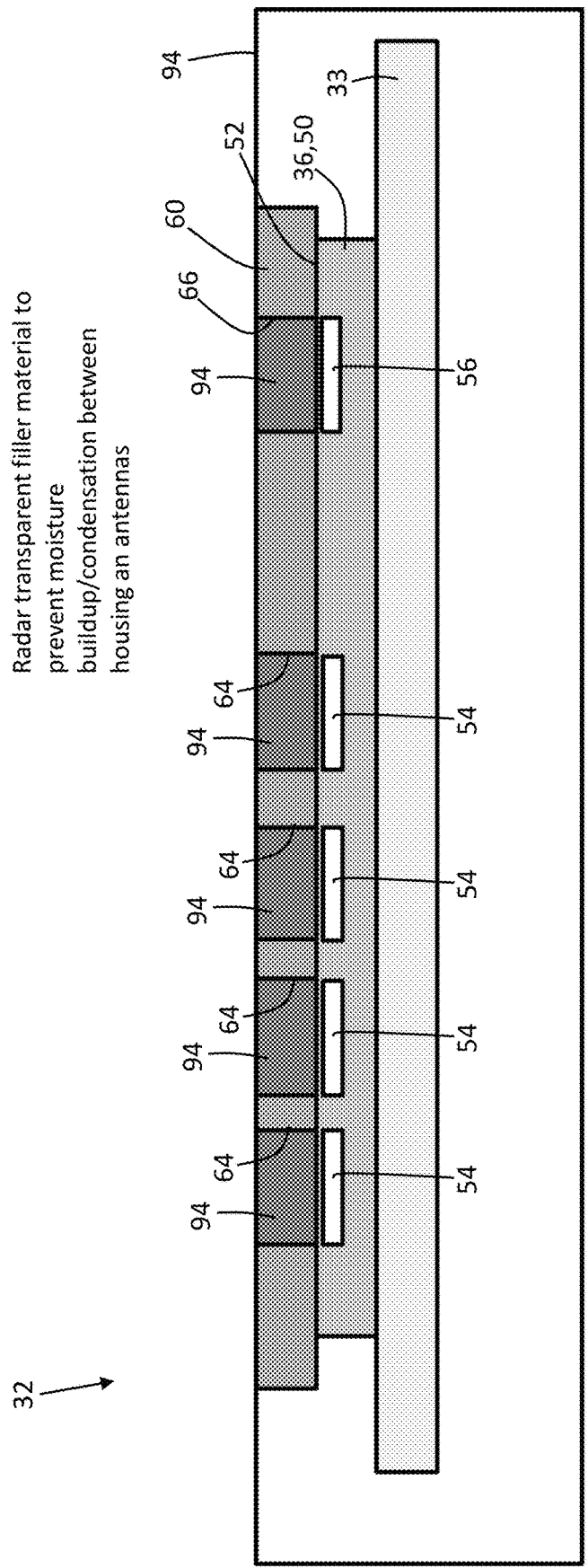
FIG. 11 is a schematic diagram of the radar transceiver with the front-mounted heat sink.

As shown in FIG. 11, the radar transceiver 32 with the front-mounted heat sink 60 is mounted within an enclosure 94 (e.g., within a door handle assembly) and includes a filler 96 of radar-transparent material, such as potting material, disposed within each of the first and second apertures 64, 66. The filler 96 may prevent moisture, such as condensation, or other contaminants, such as dust or dirt from forming or accumulating between the antennas 54, 56 and the enclosure 94.

Figure 12:
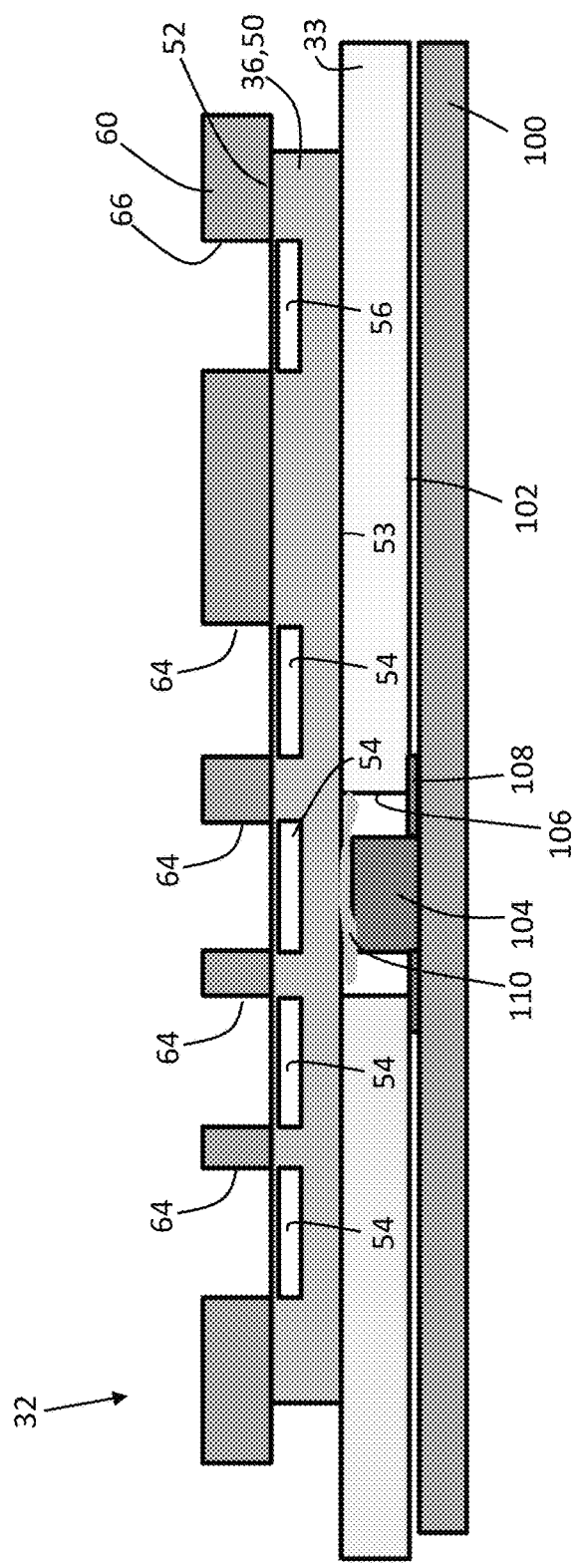
FIG. 12 is a schematic diagram of the radar transceiver with the front-mounted heat sink and a back-mounted heat sink.

As shown in FIG. 12, the radar transceiver 32 may include a back-mounted heat sink 100 disposed adjacent to a back side 102 of the sensor PCB 33, opposite from the radar transceiver 36. The back-mounted heat sink 100 may make contact with a back side 102 of the sensor PCB 33 for transmitting or dissipating heat therefrom. Alternatively, the back-mounted heat sink 100 may be spaced apart from the back side 102 of the sensor PCB 33, thus precluding the back-mounted heat sink 100 from short circuiting any components of the sensor PCB 33. In some embodiments, the front-mounted heat sink 60 and the back-mounted heat sink 100 may be two pieces or parts or portions of a sensor heat sink, which may be formed from a single, or monolithic, piece of material. In some embodiments, the sensor heat sink may include two or more pieces or parts or portions, including the front-mounted heat sink 60 and the back-mounted heat sink 100, which may be joined together to form a heat sink assembly.

In some embodiments, the radar transceiver 32 includes a post 104 that extends through a hole 106 in the sensor PCB 33. The post 104 provides thermal conductivity between a back side 53 of the radar transceiver 36 and the back-mounted heat sink 100. Such a configuration may help to remove heat generated by power electronic devices, such as transistors, located within the radar transceiver 36 and adjacent to the back side 53 thereof. A compliant thermal conductor 110, such as thermally-conductive paste, may be disposed between the back side 53 of the radar transceiver 36 and the post 104 to enhance thermal conduction therebetween.

In some embodiments, the back-mounted heat sink 100 includes a lip 108 adjacent to the post 104, which is configured to engage the back side 102 of the sensor PCB 33, thereby preventing the post 104 from imparting an excessive force on the back side 53 of the radar transceiver 36, which could otherwise damage the radar transceiver 36.

Figure 13:
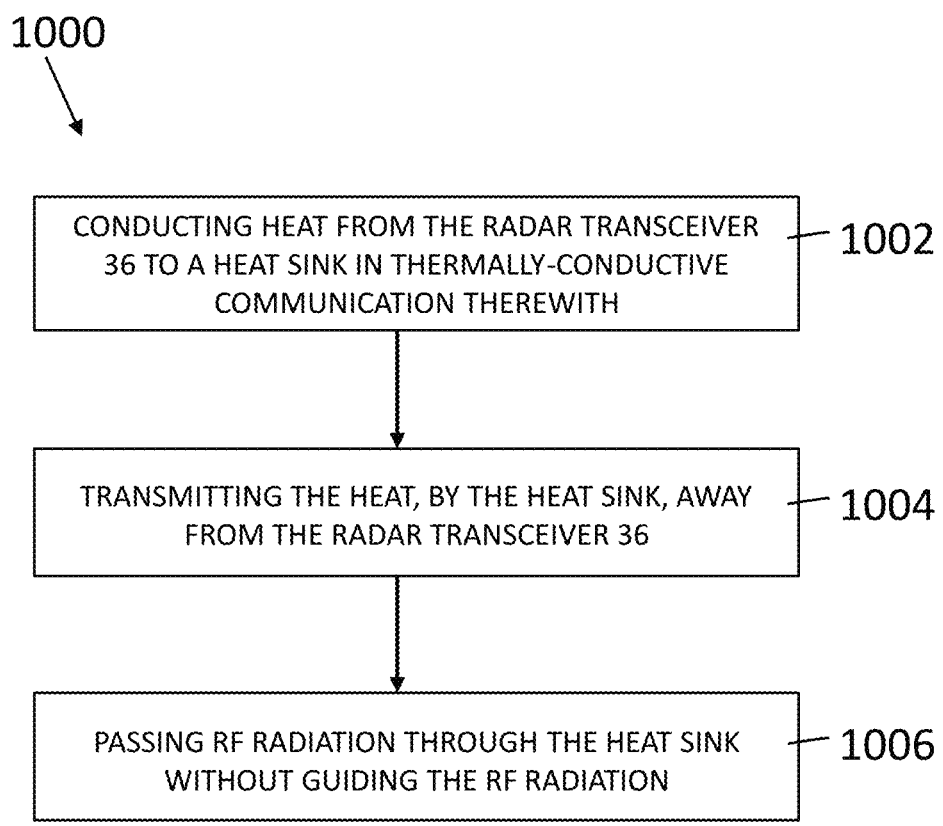
FIG. 13 is a flow chart for a method for dissipating heat from a radar sensor without interfering or guiding RF radiation to and from the radar sensor.

As shown in FIG. 13, a method 1000 of dissipating heat from a radar transceiver 36 includes, at step 1002, conducting heat from the radar transceiver 36 to a heat sink in thermally-conductive communication therewith. For example, the front-mounted heat sink 60 may conduct heat from the radar transceiver 36. At step 1004, the method 1000 includes transmitting the heat, by the heat sink, away from the radar transceiver. For example, the front-mounted heat sink 60 may transmit the heat away from the radar transceiver 36. At step 1006, the method 1000 includes passing RF radiation through the heat sink without guiding the RF radiation. For example, the first apertures 64 and the second apertures 66 of the front-mounted heat sink 60 may allow the unimpeded passing of the RF radiation through the front-mounted heat sink 60 to or from a corresponding antenna 54, 56 of the radar transceiver 36.

Thus, a radar sensor disposed at a vehicle transmits RF radiation exterior the vehicle and receives reflected RF radiation such as for object detection. The radar sensor may be disposed at any suitable vehicle component, such as within a door handle assembly of the vehicle. The radar sensor generates heat that must be dissipated to maintain a suitable operating temperature for the radar sensor. A front-mounted heat sink may be mounted or attached or otherwise disposed at a front surface of the radar sensor for dissipating heat from the radar sensor. To reduce or eliminate or preclude interference or guidance of the RF radiation by the front-mounted heat sink, the front-mounted heat sink is configured to allow RF radiation to pass through without interfering or guiding the RF radiation. For example, the front-mounted heat sink may include one or more apertures that align with one or more corresponding antennas of the radar sensor. The front-mounted heat sink may also include a series of ramps configured to define V-shaped grooves. The V-shaped grooves may align with or frame or correspond to the one or more apertures to allow RF radiation to emanate unimpeded from antennas aligned with the apertures.

When a radar sensor, or any suitable heat-generating electronic component, is disposed at a door handle assembly of a vehicle, dissipating heat from the electronic component and the door handle assembly is important for maintaining a suitable operating temperature for the electronic component and to avoid presenting a heated surface that a user may grasp when opening and closing the vehicular door. As discussed below, a vehicular door handle assembly that includes a heat-generating electronic component may include a front-mounted heat sink, such as described above, and/or one or more other heat dissipating components or features.

Figure 14:
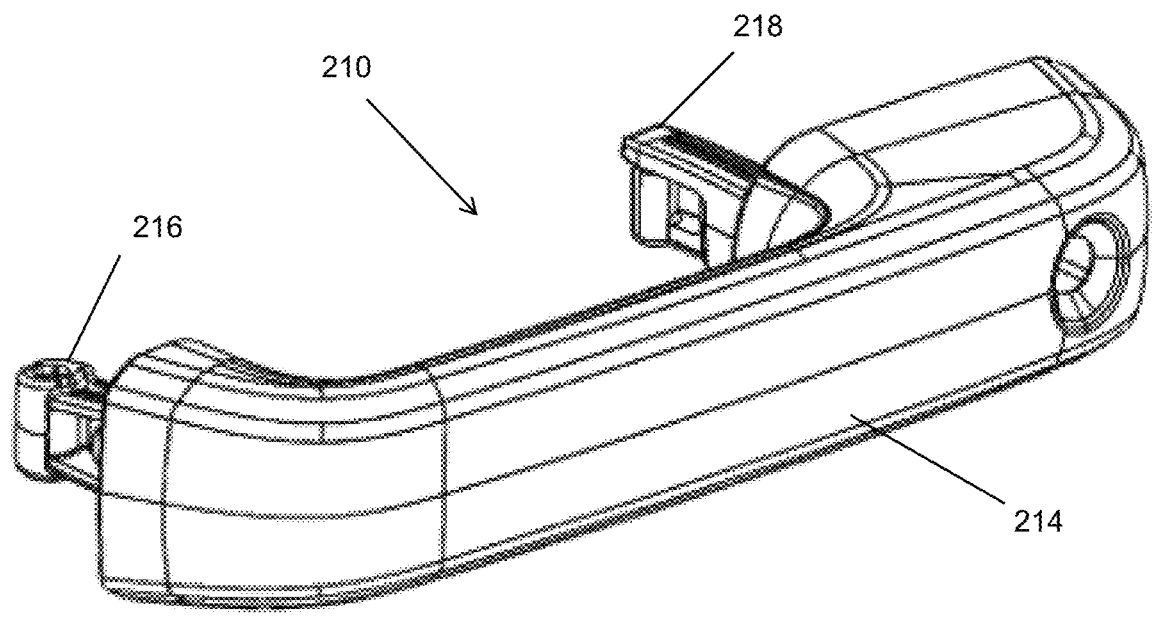
FIGS. 14 and 15 are perspective views of a door handle assembly.
Figure 15:
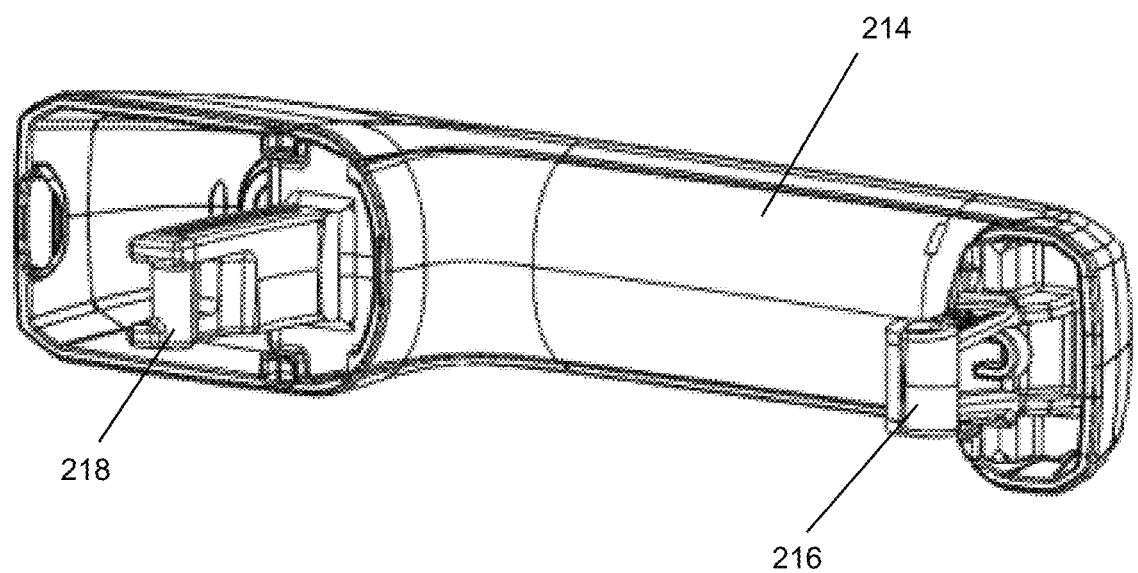

As shown in FIG. 14, the vehicular door handle assembly 210 includes a handle portion 214 and the handle portion includes one or more electronic components, such as a printed circuit board (PCB) and/or the radar unit. For example, the door handle may include the radar sensor or sensing unit for sensing proximity of objects as part of an automatic liftgate or door locking/unlocking or closing/opening function of the vehicle. The handle may include additional or other electronic components within the door handle The door handle includes one or more electronic (and heat generating) components disposed within the handle portion and one or more heat dissipating or cooling components configured to provide thermal management at the door handle such as by reducing the temperature within the handle portion and/or dissipating heat from the electronic component, thus providing thermal management solutions at a door handle system level for integration of a mmWave radar module used to detect objects for applications such as power-door actuation or the like.

Figure 16:
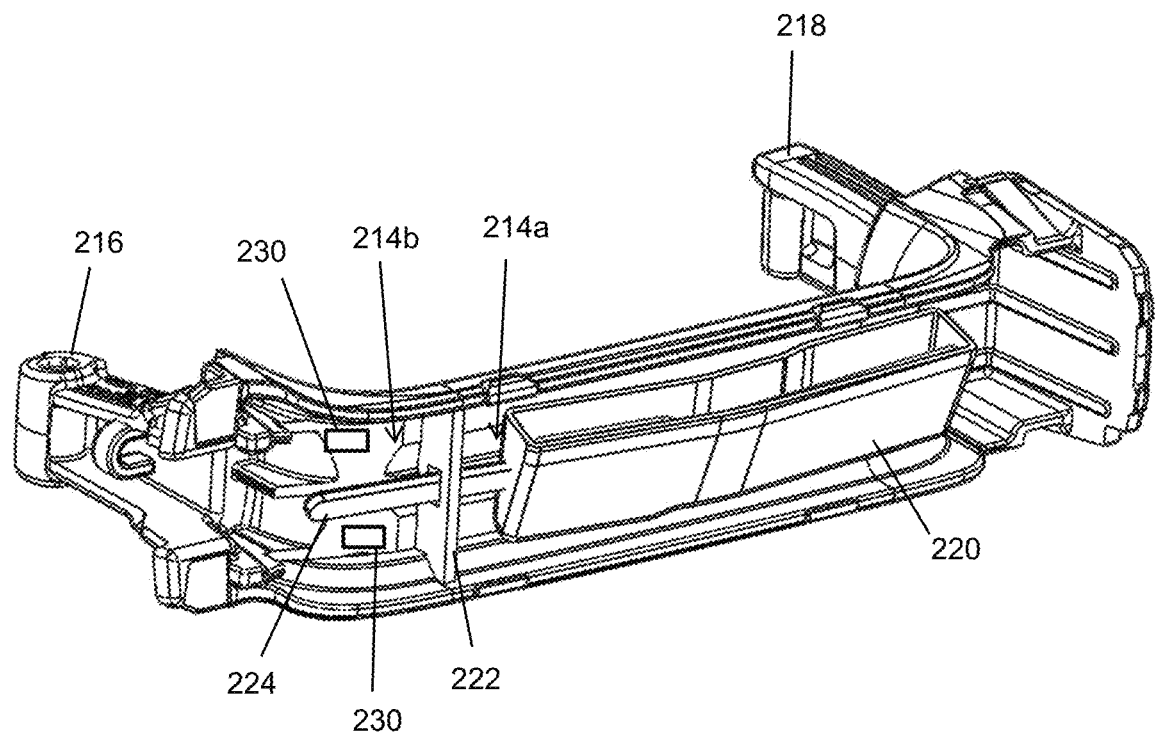
FIG. 16 is a perspective view of the door handle assembly of FIGS. 14 and 15 with a radar unit disposed at an interior portion of the handle portion of the door handle assembly.

In reference to FIGS. 14-17, the door handle assembly 210 includes a handle portion 214 that includes a pivot end 216 pivotally attached at the door and a latch end 218 connected to a latch mechanism to operate a latch when a user grabs and/or pulls the handle to open the door. As shown in FIG. 16, a radar unit 220 is disposed within the handle portion 214 of the door handle assembly. The radar unit 220 includes a printed circuit board (PCB) that includes electronic circuitry or components (including electronic circuitry, including transmitting antennas and receiving antennas and optionally a processor for controlling the antennas and/or for processing outputs of the receiving antennas). The PCB may comprise a rigid PCB or may comprise a flexible PCB that may conform to the curvature or form of the handle portion.

The radar unit is disposed within a hot zone 214a of the interior of the door handle assembly where heat generated by operation of the radar unit is at least partially retained and thermally separated from a cold zone 214b of the interior of the handle portion by a thermally insulating barrier 222. The thermally insulating barrier 222 separates the interior portion of the handle portion of the door handle assembly into the hot zone 214a (where the radar unit operates and generates heat) and the cold zone 214b (where there is not an electronic component generating heat) so that heat generated by operation of the radar unit may be dissipated from the hot zone to the cold zone and then more readily dissipated from the handle portion at the cold zone. A heat pipe 224 thermally connecting the radar unit 220 to the cold zone protrudes from the radar unit, through an aperture in the thermally insulating barrier, and into the cold zone.

Figure 17:
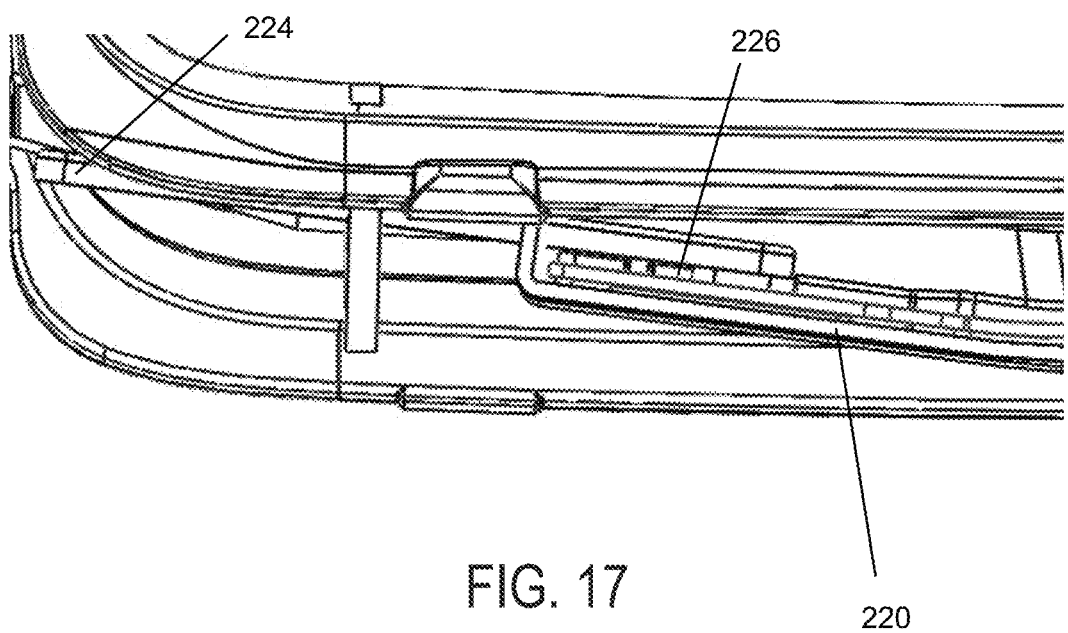
FIG. 17 is a partial view of the door handle assembly of FIG. 16, showing the connection of a heat pipe to the radar unit.

The heat pipe 224 may comprise a solid bar of thermally conductive material (such as aluminum or copper) or may include a working fluid configured to carry heat away from the radar unit and thus from the hot zone to the cold zone. The heat pipe 224 may terminate in the handle portion (such as within the cold zone, such as shown in FIG. 16) or the heat pipe may terminate exterior the handle portion or within the door cavity. As shown in FIG. 17, the heat pipe may be in thermally conductive connection with the PCB of the radar unit, such as via a thermal grease 226, to provide enhanced heat dissipation from the radar unit. Optionally, the heat pipe may be in thermally conductive connection with a heat sink element disposed at the radar unit, such as a front-mounted heat sink element as described above, to further draw heat from the radar unit within the hot zone to the cold zone and/or exterior of the handle portion. Optionally, the handle portion may include air vents or vent slots 230 disposed at or formed through an exterior wall or portion of the handle portion to allow airflow from exterior the door handle and to promote convection and heat dissipation of heat emanating from the heat pipe in the cold zone.

Figure 18:
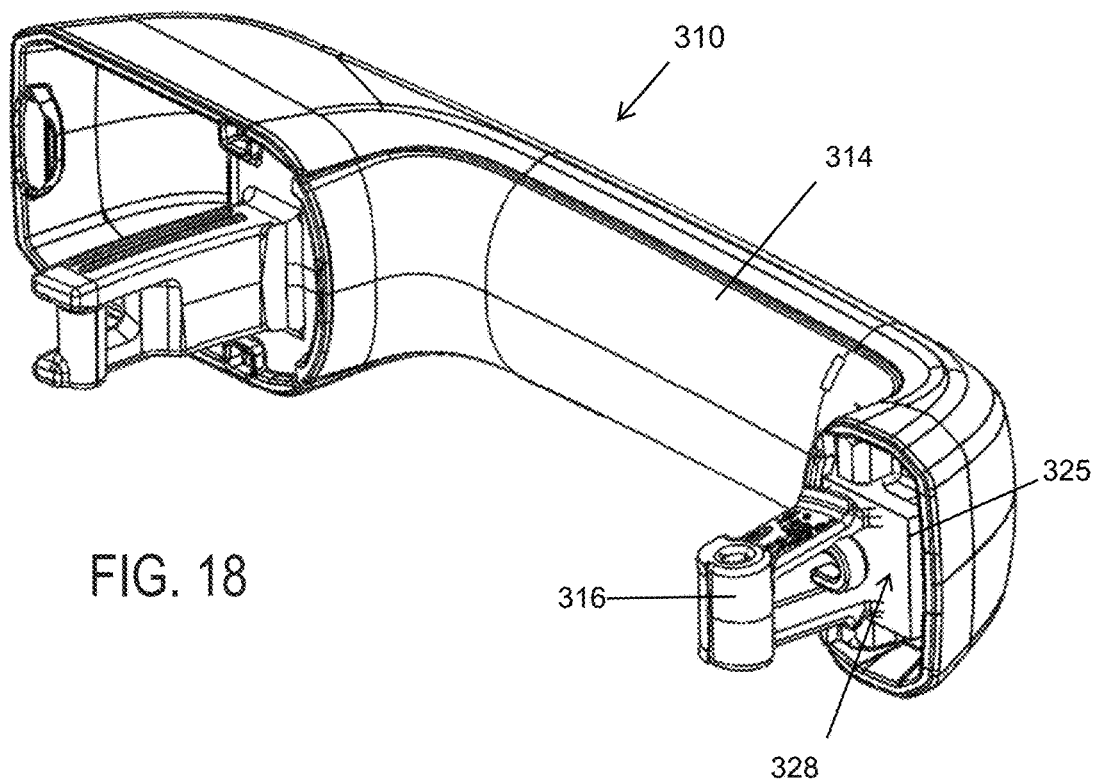
FIG. 18 is a perspective view of a door handle assembly with a heat sink element protruding from the handle portion.
Figure 19:
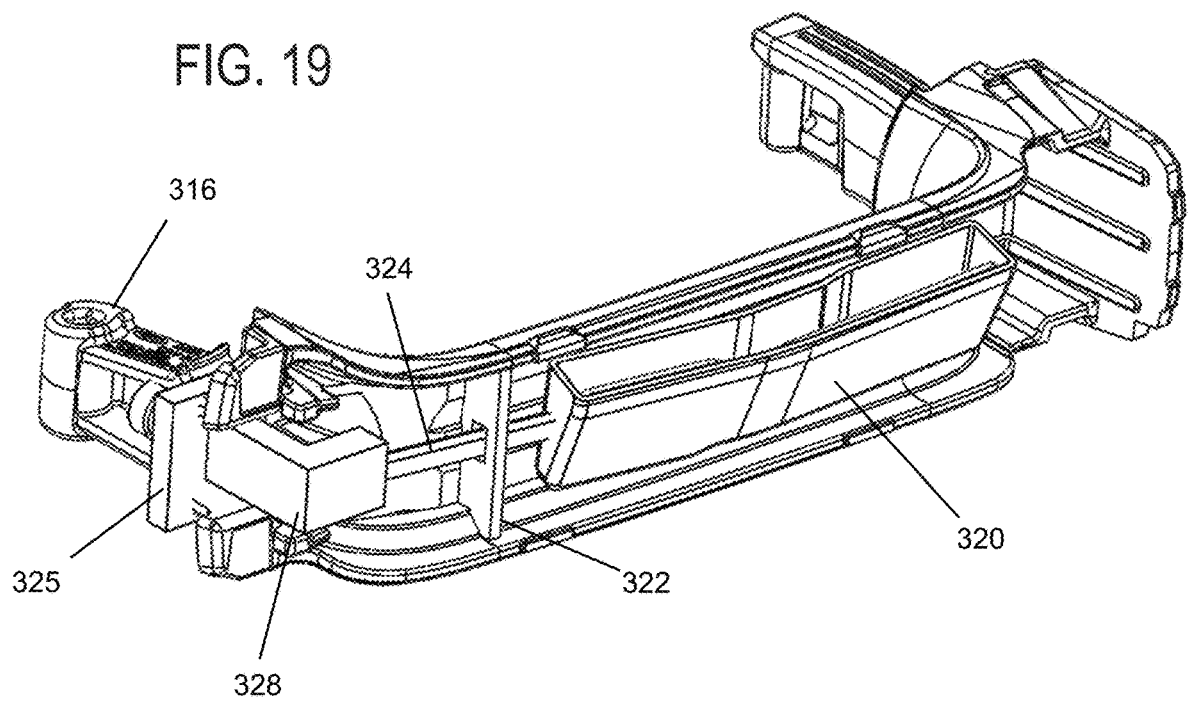
FIG. 19 is a partial view of the door handle assembly of FIG. 18.

The heat pipe may terminate in the handle portion (such as within the cold zone, such as shown in FIG. 16) or the heat pipe may terminate exterior the handle portion or within the door cavity. For example, and with reference to FIGS. 18 and 19, the door handle assembly may include a device designed to exhaust thermal energy outside of the handle assembly. For example, a door handle assembly 310 may include a heat pipe 324 that extends from the radar unit 320 and that passes through the thermally insulating barrier 322 and is connected to or received within a heat sink element 328. The heat sink element 328 receives the heat pipe 324 within the cold zone in the interior of the handle portion and protrudes outside of the handle body to move thermal energy outside of the handle portion. For example, an end 325 of the heat pipe or heat sink may protrude from the handle body at the pivot end 316 of the handle portion 314 to be disposed within and dissipate heat from the radar unit to the cavity of the door of the vehicle.

Figure 20:
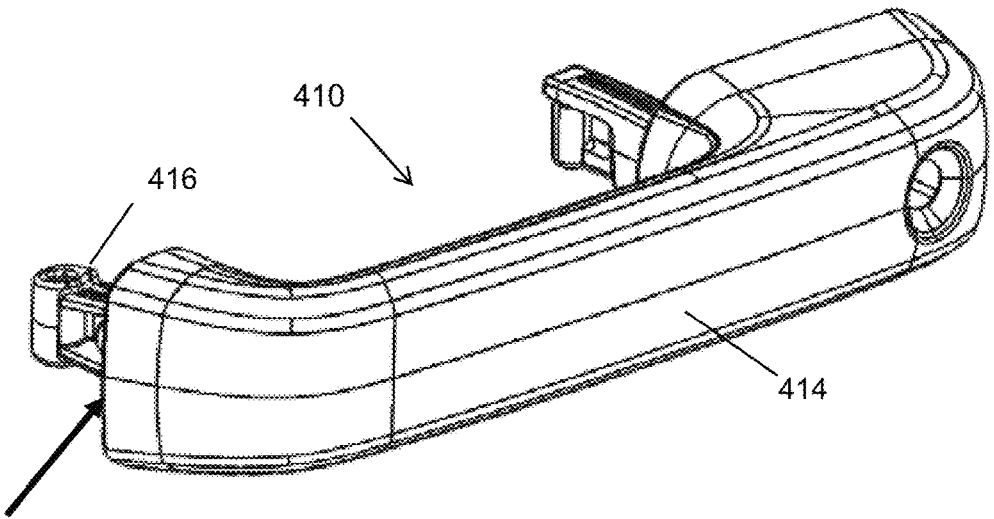
FIGS. 20 and 21 are perspective views of a door handle assembly, showing airflow through the handle during vehicle movement.
Figure 21:
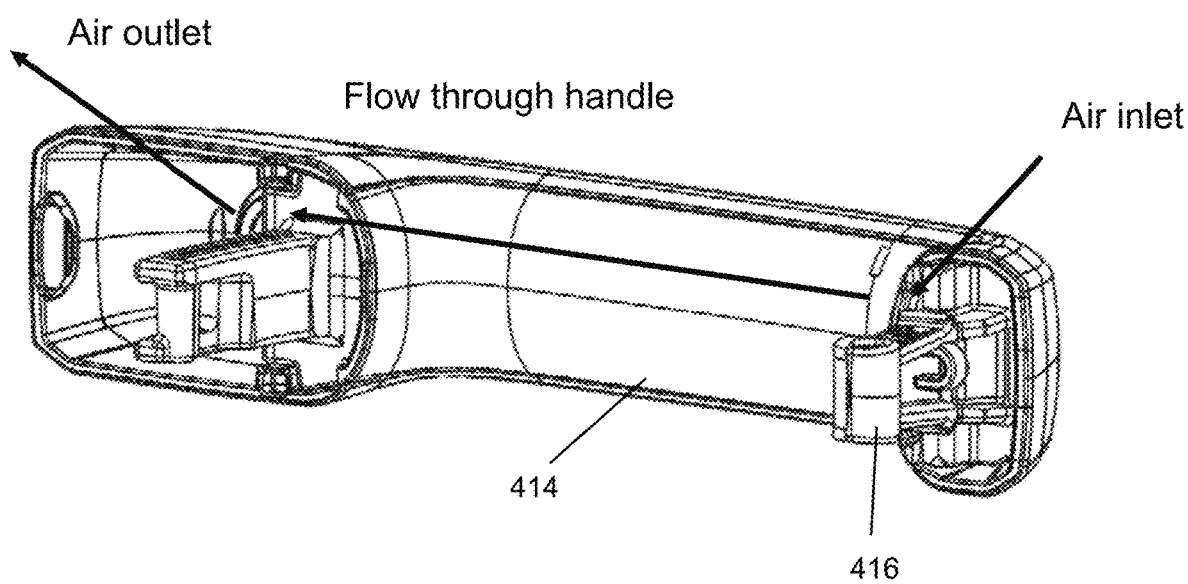
Figure 22:
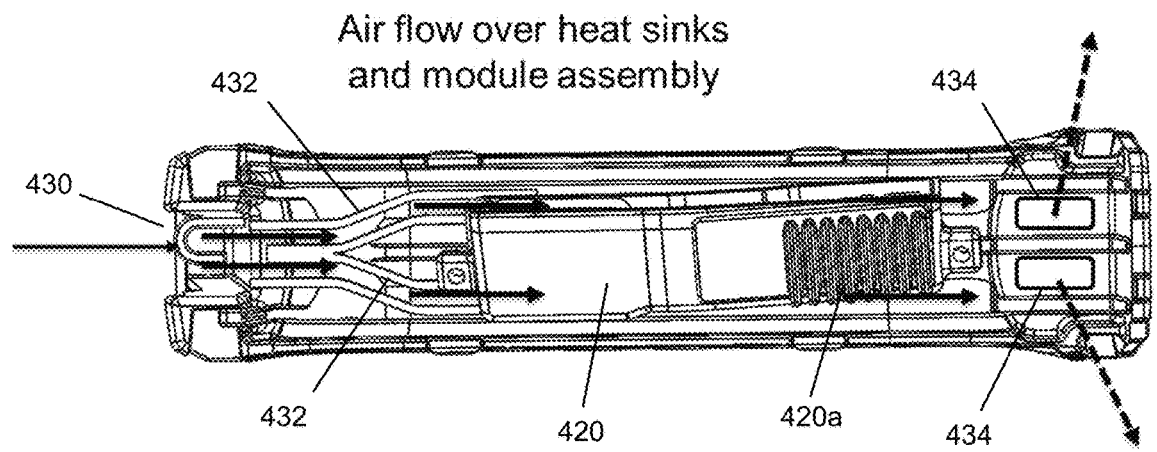
FIG. 22 is a plan view of the door handle assembly of FIGS. 20 and 21, with air channels for directing airflow during vehicle movement.

Referring to FIGS. 20-22, a door handle assembly 410 may include a handle portion 414, and the handle portion may be configured to provide active cooling for the electronics during driving or operation of the vehicle, such as by including air inlets to promote airflow through and around the handle portion. During vehicle operation, airflow is channeled through the body of the handle to cool the electronics. The handle portion 414 may include active air inlets 430 so that airflow enters from the front of the handle (at the pivot end 416), where the front of the handle is towards the front of the vehicle so that as the vehicle travels forward, airflow travels along the handle from the front to the rear of the handle and across the electronics to promote heat dissipation. The handle portion may include channels 432 such as to direct airflow in and around the radar unit 420 and/or one or more heat sinks 420a attached to or integrated into the radar unit to promote additional heat dissipation. The heat sinks 420a attached to or integrated into the radar unit 420 may be disposed at the PCB of the radar unit (that includes electronic circuitry, including transmitting antennas and receiving antennas and optionally a processor for controlling the antennas and/or for processing outputs of the receiving antennas) and connected to the radar unit, such as at a cutout at the rear of the radar unit (with the PCB at the cutout may be formed to receive a portion of the heat sink to connect to the heat sink). The channels 432 may be disposed at the interior surface of the handle portion. One or more active air outlets 434 may be disposed at the rear of the handle portion to direct airflow out of the handle portion. The one or more active air inlets and/or active air outlets may be designed into and disposed at any location on the handle assembly to promote active airflow through the handle when the vehicle is in operation.

Figure 23:
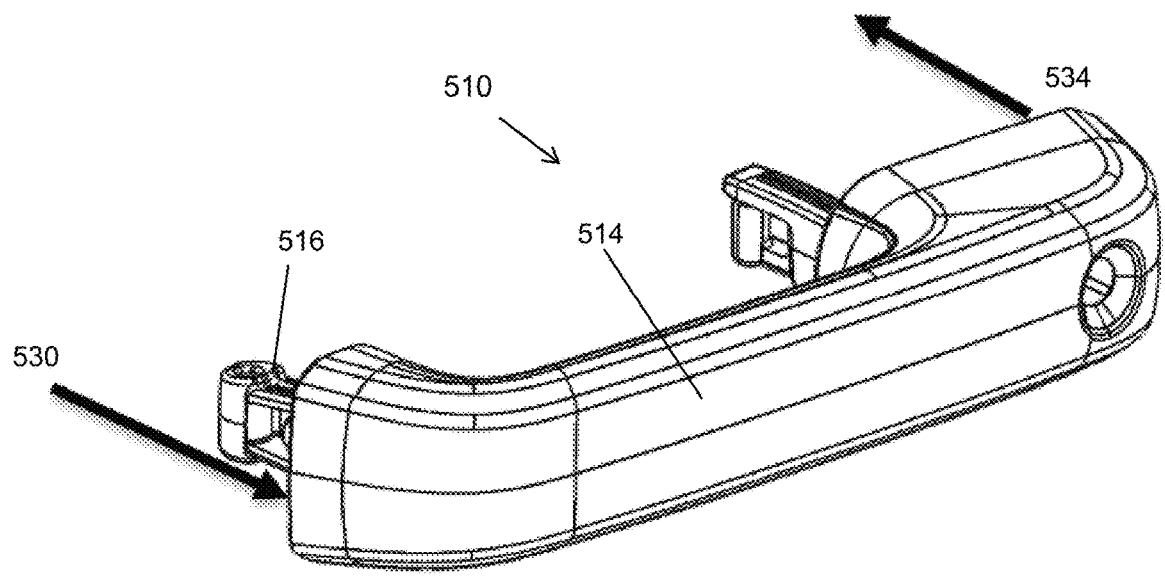
FIG. 23 is a perspective view of a door handle assembly, showing active airflow via a fan assembly.
Figure 24:
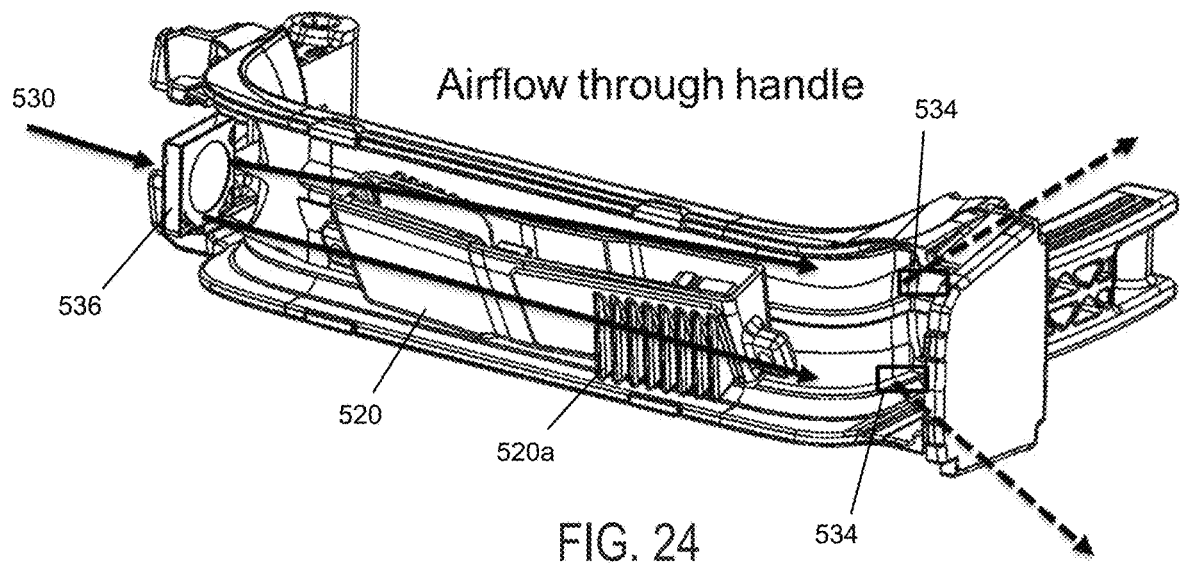
FIG. 24 is a perspective view of the door handle assembly of FIG. 23, showing airflow through the handle via the fan assembly.

Optionally, and such as shown in FIGS. 23 and 24, a door handle assembly 510 may provide active cooling of the electronic components via a fan assembly 536 disposed at the front of the interior portion of the handle portion 514 (at the pivot end 516). The fan assembly 536 directs air, such as from a fan air inlet 530, toward the radar unit 520 (and over and around a heat sink element 520a connected to the PCB of the radar unit via a cutout) within the interior of the handle portion to provide the active cooling and maintain a suitable temperature at the radar unit, such as under 115 degrees Celsius, in all conditions. The air may vent through fan air outlets 534 to promote convection. Optionally, the fan assembly may be disposed at the rear of the interior portion of the handle portion near the fan air outlets to increase exhaust of hot air from the handle portion. The fan assembly 536 may comprise any suitable fan assembly, such as one that uses 0.15 Watts of power and provides 0.17 cubic feet per minute (CFM) of airflow and may be electrically powered via a power source of the vehicle. For example, the fan assembly 536 may be electrically connected to the same power source as the radar unit 520 within the handle assembly.

Figure 25:
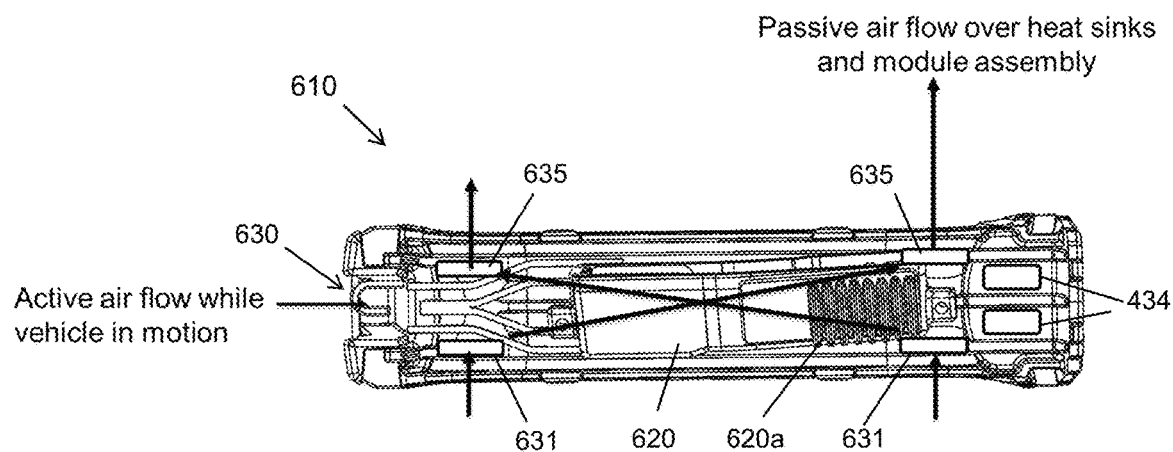
FIG. 25 is a plan view of a door handle assembly with air inlets, air outlets, and air channels for directing active and passive airflow through the handle portion.

It should be understood that the arrows depicting airflows through the handle (such as in FIGS. 20-24) merely show possible airflows from the air inlet, through the handle portion (such as directed by channels and/or a fan assembly), to the air outlets. Other configurations of the door handle assembly are possible with various locations and arrangements of air inlets, air outlets, and/or channels for providing heat dissipation from the handle portion. For example, FIG. 25 depicts a door handle assembly 610 where active air inlets 630, air channels 632 and active air outlets 634 are disposed in the handle portion to allow and guide active airflow while the vehicle is in motion. Additionally, passive air inlets 631 and passive air outlets 635 allow passive airflow when the vehicle is not in motion. The handle portion is designed to encourage natural convection and promote airflow over the radar unit 620 (and integrated or connected heat sink 620a) of the door handle assembly.

Figure 26:
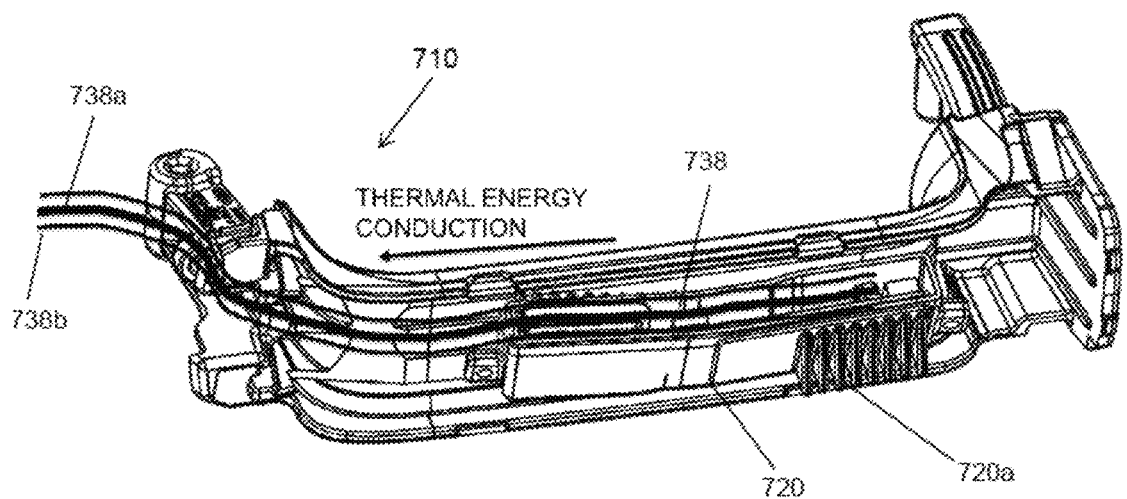
FIG. 26 is a perspective view of a door handle assembly with a metallic sheath element in thermally conductive connection with a radar unit.

The electronic components may also be in thermally conductive connection with other heat dissipating devices. For example, and as shown in FIG. 26, a door handle assembly 710 includes a metallic wire sheath assembly 738 in thermally conductive connection with the radar unit 720. The wire sheath assembly 738 may comprise a wire bundle 738a wrapped in a metallic sheath 738b or braid or potting material. The sheath assembly is run through the handle portion to be connected to the radar unit 720 (such as at the heat sink 720a) and is in thermally conductive connection exterior the handle assembly to draw thermal energy out of the housing. For example, the sheath assembly 738 may be attached to a heat sink exterior the handle assembly and/or disposed in the cavity of the door of the vehicle.

Figure 27:
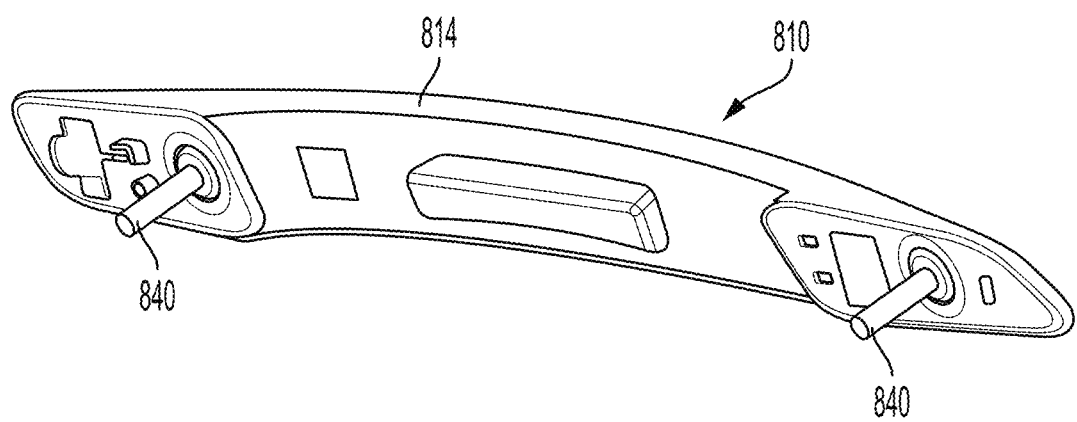
FIG. 27 is a perspective view of a door handle assembly configured to be fixedly attached at a door of a vehicle via metallic studs.
Figure 28:
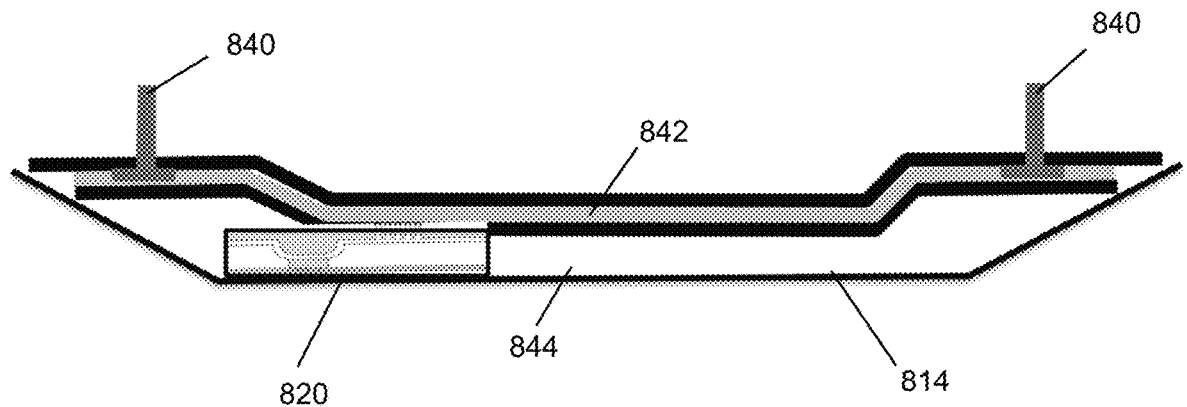
FIGS. 28 and 29 are schematic diagrams of door handle assemblies having radar units and configured to be fixedly attached at a door of a vehicle via metallic studs.
Figure 29:
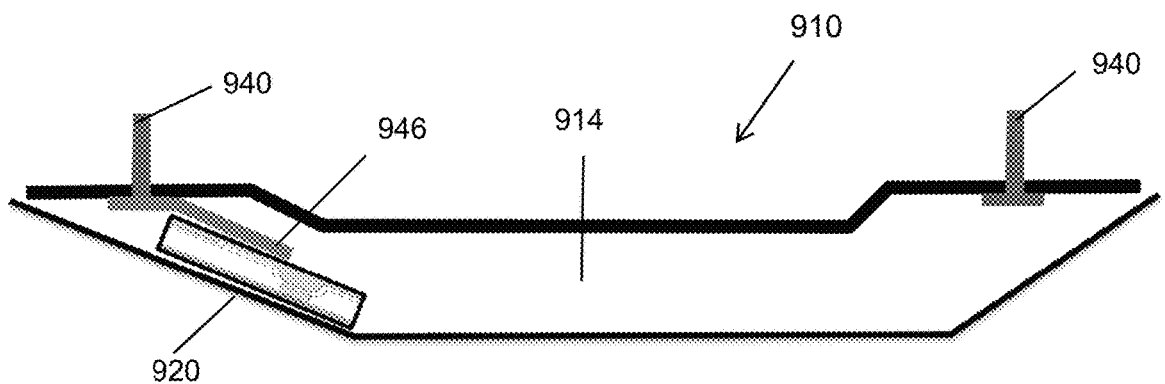

If the handle assembly comprises a fixed handle (where the handle is not pivotable relative to the door of the vehicle), such as shown in FIGS. 27-29, the door handle assembly may comprise a handle portion fixedly mounted at a door of a vehicle via metallic studs (whereby the door is opened via a sensor that senses touch or proximity of a user's hand at the handle portion). For example, and as shown in FIGS. 27 and 28, a fixed door handle assembly 810 includes a radar unit 820 disposed within the handle portion 814 and in thermally conductive connection with the metallic studs 840 mounted to the door of the vehicle. Thus, heat generated by the radar unit 820 may be dissipated through the studs 840 and/or out to another heat dissipating component (such as the door of the vehicle or a heat sink or other component disposed at the door or handle bracket of the vehicle).

As shown in FIG. 28, the radar unit 820 may be in thermally conductive connection with a metallic diecast core 842 of the handle portion that is in turn in thermally conductive connection with the studs 840. The metal die cast (of the metallic core) makes contact with the radar module 820 (such as at a heat sink of the radar module) via direct contact (metal to metal) or via indirect contact. For example, the radar unit may be in thermally conductive connection with the metallic core 842 through a thermally conductive paste, gel, or pad disposed between the radar unit and the metallic core of the handle assembly. The metallic core 842 may be overmolded with a plastic cover 844 to provide the class-A portion of the handle that is touched when a user grabs the handle. The plastic cover 844 provides a less thermally conductive surface to touch, thereby mitigating the chance that a user could burn their fingers due to heat generated from the radar unit when the user is grabbing the door handle.

With reference to FIG. 29, a fixed door handle assembly 910 includes an entirely plastic handle portion 914 (as a singular piece or with separate non-metallic core and cover) and a radar unit 920 in thermally conductive contact with the studs 940. In the illustrated embodiment, the stud makes contact with a heat sink of the radar unit. The studs may have a larger slug of material comprising a mounting component 946 to help pull heat from the unit to the heat sink. For example, the radar unit 920 may be in thermally conductive connection with one or more of the metallic studs through mounting at a mounting plate or bracket and/or via a thermally conductive paste, gel, or pad disposed between the radar unit and the metallic stud or mounting portion. Alternatively a heat sink or metal component that is not the stud could pass from the handle portion through the door to make contact with a larger heat sink in the door or handle bracket.

Thus, the door handle assembly is disposed at a door of a vehicle and includes electronic components (such as a radar unit) that generate heat. The handle assembly includes one or more heat dissipating or cooling features for regulating the temperature of the electronic components. The above described heat dissipating features may be implemented individually or combined with one another to provide the desired or appropriate cooling features, depending on the particular door handle application.

The door handle assembly may comprise any suitable type of door handle assembly, and may include or incorporate aspects of the door handle assemblies described in U.S. Pat. Nos. 6,349,450; 6,550,103; 6,907,643; 7,407,203; 8,333,492; 8,786,401; 8,801,245 and/or 9,290,970, and/or U.S. Publication Nos. US-2020-0130646; US-2020-0122631; US-2019-0106051; US-2010-0088855 and/or US-2010-0007463 and/or U.S. patent application Ser. No. 17/305,826, filed Jul. 15, 2021, and/or U.S. provisional application Ser. No. 63/200,339, filed Mar. 2, 2021, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly. Optionally, aspects of the handle assembly may be suitable for use with a liftgate handle assembly for a liftgate or tailgate of a vehicle.

Optionally, the door handle assembly may comprise a flush door handle assembly such as of the types described in U.S. Pat. No. 8,786,401 and/or U.S. Publication No. US-2020-0102773, which are hereby incorporated herein by reference in their entireties. Optionally, the door handle assembly may include a soft touch handle portion, such as utilizing the principles described in U.S. Pat. Nos. 6,349,450; 6,550,103 and/or 6,907,643, which are hereby incorporated herein by reference in their entireties.

The radar sensors disposed in the door handle portion may comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The radar sensors may be part of a system that may include an ECU or control that includes a data processor for processing sensor data captured by the radar sensors.

The door handle may include one or more sensors, such as radar or lidar sensors or the like, to detect presence of and/or range to other vehicles and objects near the vehicle door. For example, the radar unit may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Optionally, the electronic components within the door handle assembly may include sensing techniques to detect presence of the user's hand near the door handle assembly or in the pocket region of the door handle assembly. For example, the door handle assembly may provide capacitive sensing, SURETOUCH™ sensing, pressure (i.e., piezoelectric) sensing, inductive sensing, or the like, and/or may provide for mechanical actuation of the door latch mechanism by the user's hand in the pocket region.

Optionally, the door handle assembly may include or may be associated with an antenna for receiving signals from or communicating with a remote device. For example, the antenna (such as, for example, an antenna of the types described in U.S. Pat. Nos. 9,484,626 and/or 6,977,619, which are hereby incorporated herein by reference in their entireties) may communicate a signal to a door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or an illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 8,764,256; 6,280,069; 6,276,821; 6,176,602; 6,152,590; 6,149,287; 6,139,172; 6,086,229; 5,938,321; 5,671,996; 5,497,305; 6,416,208 and/or 6,568,839, and/or U.S. Publication No. US-2013-0242586, all of which are hereby incorporated herein by reference in their entireties), or the vehicle ignition, or any other desired system. The door handle and/or illumination module may be in communication with other systems and/or controls of the vehicle door and/or vehicle, such as by utilizing aspects of the door systems described in U.S. Publication No. US-2010-0007463, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular radar sensor assembly comprising:
a sensor printed circuit board (PCB) having a first side and a second side opposite the first side and separated from the first side by a thickness of the sensor PCB;
a radar transceiver disposed at the first side of the sensor PCB and comprising a plurality of antennas configured for transmitting and receiving radio frequency (RF) radiation;
a heat sink in thermal conductivity with the radar transceiver and configured to dissipate heat from the radar transceiver, wherein the radar transceiver is disposed between the heat sink and the sensor PCB;
wherein, when the vehicular radar sensor assembly is operated, RF radiation transmitted by the radar transceiver passes through the heat sink; and
wherein the heat sink is configured to allow the transmitted RF radiation to pass through the heat sink without functioning as a waveguide for the RF radiation.

2. The vehicular radar sensor assembly of claim 1, wherein the heat sink comprises a plurality of apertures, and wherein antennas of the plurality of antennas are juxtaposed with respective apertures of the plurality of apertures.

3. The vehicular radar sensor assembly of claim 2, wherein antennas of the plurality of antennas comprise a shape, and wherein respective apertures of the plurality of apertures comprise corresponding shapes.

4. The vehicular radar sensor assembly of claim 2, wherein the heat sink comprises a ramp comprising a slope toward at least one aperture of the plurality of apertures.

5. The vehicular radar sensor assembly of claim 1, comprising a second heat sink disposed at the second side of the sensor PCB and configured to dissipate heat from the radar transceiver.

6. The vehicular radar sensor assembly of claim 5, comprising a post extending through an aperture in the sensor PCB and providing thermal conductivity between the radar transceiver and the second heat sink.

7. The vehicular radar sensor assembly of claim 5, wherein the sensor PCB and the radar transceiver are disposed between the heat sink and the second heat sink.

8. The vehicular radar sensor assembly of claim 1, wherein the vehicular radar sensor assembly is disposed at a handle portion of a vehicular door handle assembly.

9. The vehicular radar sensor assembly of claim 1, wherein, with the vehicular radar sensor assembly mounted at a vehicle, the vehicular radar sensor assembly, when operated, senses at least one object exterior the vehicle.

10. A method of dissipating heat from a radar transceiver of a vehicular radar sensor assembly, the method comprising:
providing a vehicular radar sensor assembly at a vehicle, the vehicular radar sensor assembly comprising a sensor printed circuit board (PCB) having a first side and a second side opposite the first side and separated from the first side by a thickness of the sensor PCB;
disposing a radar transceiver of the vehicular radar sensor assembly at the first side of the sensor PCB, the radar transceiver comprising a plurality of antennas for transmitting and receiving radio frequency (RF) radiation;
providing a heat sink in thermal conductivity with the radar transceiver, wherein the radar transceiver is disposed between the heat sink and the sensor PCB;
operating the vehicular radar sensor assembly to transmit and/or receive RF radiation at the plurality of antennas of the radar transceiver;
wherein, while the vehicular radar sensor assembly is operated, RF radiation transmitted by the radar transceiver passes through the heat sink, and wherein the heat sink is configured to allow the transmitted RF radiation to pass through the heat sink without functioning as a waveguide for the RF radiation;
while the vehicular radar sensor assembly is operated, conducting heat from the radar transceiver to the heat sink; and
dissipating the heat, by the heat sink, away from the radar transceiver.

11. The method of claim 10, wherein the heat sink comprises a plurality of apertures, and wherein antennas of the plurality of antennas are juxtaposed with respective apertures of the plurality of apertures, and wherein the transmitted RF radiation passes through the heat sink at the plurality of apertures.

12. The method of claim 10, wherein the vehicular radar sensor assembly is disposed at a handle portion of a vehicular door handle assembly that is configured for mounting at the vehicle.

* * * * *